(12) United States Patent
Leem et al.

(10) Patent No.: US 10,573,177 B2
(45) Date of Patent: Feb. 25, 2020

(54) VEHICLE CONTROLLING TECHNOLOGY

(71) Applicant: LG ELECTRONICS INC., Seoul (KR)

(72) Inventors: Chaehwan Leem, Seoul (KR); Soonhong Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 15/649,308

(22) Filed: Jul. 13, 2017

(65) Prior Publication Data

US 2018/0165959 A1 Jun. 14, 2018

(30) Foreign Application Priority Data

Dec. 13, 2016 (KR) .......................... 10-2016-0169762

(51) Int. Cl.
*B60W 50/14* (2012.01)
*G08G 1/0967* (2006.01)
(Continued)

(52) U.S. Cl.
CPC ....... *G08G 1/096791* (2013.01); *B60W 50/14* (2013.01); *G05D 1/0061* (2013.01); *G05D 1/0214* (2013.01); *G05D 1/0223* (2013.01); *G08G 1/096708* (2013.01); *B60K 2370/145* (2019.05); *B60K 2370/146* (2019.05);
(Continued)

(58) Field of Classification Search
CPC ...... G08G 1/096791; G08G 1/096708; B60W 30/12; B60W 30/14; B60W 30/16; B60W 50/16; B60W 2050/143; B60W 2050/146; B60W 2420/42; B60W 2420/52; B60W 2420/54; B60W 2550/10; B60W 2550/14; B60W 2550/22; B60W 2550/30; B60W 2550/308; B60W 2550/402; G05D 1/0061; G05D 1/0214; G05D 1/0223; B60K 2370/145; B60K 2370/146; B60K 2370/1438; B60K 2370/152; B60K 2370/155; B60K 2370/21; G06K 9/00791

See application file for complete search history.

(56) References Cited

U.S. PATENT DOCUMENTS 9,278,689 B1 3/2016 Delp
2015/0057869 A1 2/2015 Healey et al.
(Continued)

FOREIGN PATENT DOCUMENTS

KR 10-2015-0051549 5/2015

OTHER PUBLICATIONS

International Search Report and Written Opinion in International Application No. PCT/KR2017/007847, dated Nov. 22, 2017, 15 pages (with English translation).

*Primary Examiner* — Anshul Sood
(74) *Attorney, Agent, or Firm* — Fish & Richardson P.C.

(57) ABSTRACT

A vehicle control device including a communication unit configured to obtain a current position of a vehicle; a sensing unit configured to sense another vehicle subject to a driving regulation and obtain current position of the other vehicle; a processor; and a computer-readable medium coupled to the processor having stored thereon instructions which, when executed by the processor, causes the processor to perform operations including autonomously driving the vehicle based on the respective current positions of the vehicle and the other vehicle in compliance with the driving regulation.

20 Claims, 17 Drawing Sheets

(51) Int. Cl.
  *G05D 1/02* (2020.01)
  *G05D 1/00* (2006.01)
  *B60W 50/16* (2020.01)

(52) U.S. Cl.
  CPC .......................... *B60K 2370/1438* (2019.05); *B60K 2370/152* (2019.05); *B60K 2370/155* (2019.05); *B60K 2370/21* (2019.05); *B60W 50/16* (2013.01); *B60W 2050/143* (2013.01); *B60W 2050/146* (2013.01); *B60W 2420/403* (2013.01); *B60W 2420/42* (2013.01); *B60W 2420/52* (2013.01); *B60W 2420/54* (2013.01); *B60W 2540/26* (2013.01); *B60W 2550/10* (2013.01); *B60W 2550/14* (2013.01); *B60W 2550/22* (2013.01); *B60W 2550/308* (2013.01)

(56) References Cited

U.S. PATENT DOCUMENTS

| | | |
|---|---|---|
| 2016/0082958 A1 | 3/2016 | Yoon |
| 2016/0288788 A1 | 10/2016 | Nagasaka et al. |
| 2017/0249839 A1* | 8/2017 | Becker ............. G08G 1/096725 |

* cited by examiner

FIG. 1
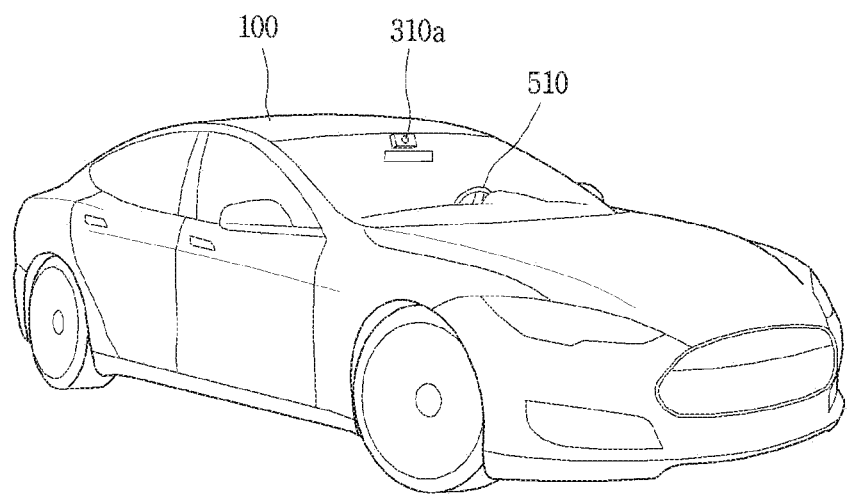
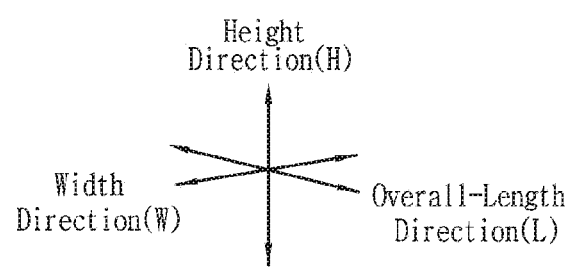

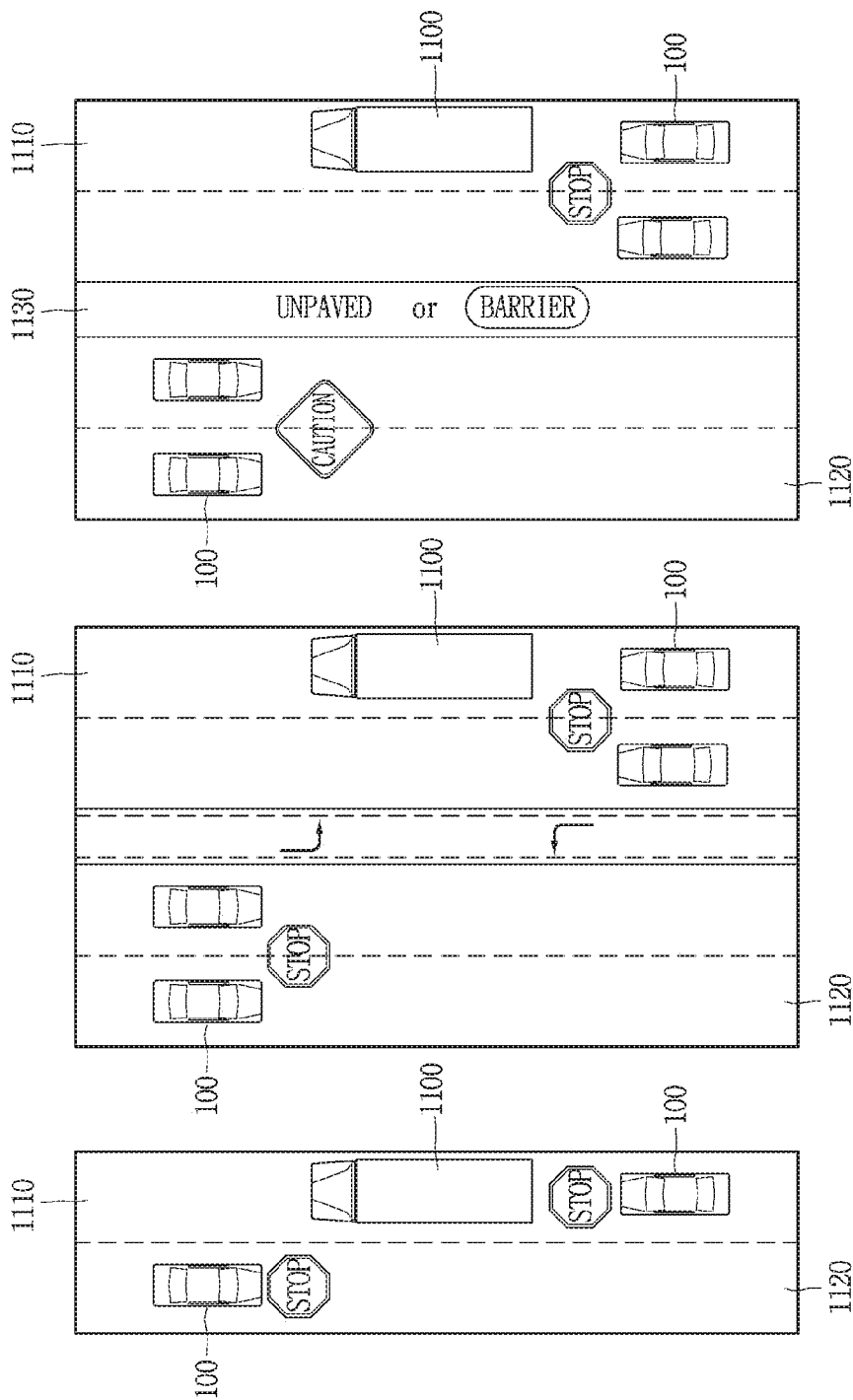

VEHICLE CONTROLLING TECHNOLOGY

CROSS-REFERENCE TO RELATED APPLICATION

Pursuant to 35 U.S.C. § 119(a), this application claims the benefit of an earlier filing date of and the right of priority to Korean Application No. 10-2016-0169762, filed on Dec. 13, 2016, the contents of which are incorporated by reference herein in its entirety.

FIELD

This specification relates to a vehicle control device for a vehicle, and a method of controlling the vehicle using the vehicle control device.

BACKGROUND

A vehicle is an apparatus capable of moving a user in the user-desired direction. A car is a representative example of a vehicle. Various types of sensors and electronic devices are provided in the vehicle for convenience of a user using a vehicle. For example, a study on an Advanced Driver Assistance System (ADAS) is actively undergoing. In addition, autonomous vehicles are under active development.

As the development of the advanced driving assist system (ADAS) progresses, development of a technology for optimizing a user's convenience and safety while driving a vehicle may be needed. Examples of such technology include a User Interface (UI)/User eXperience (UX) capable of effectively informing a user of information about a driving regulation (law) differently applied according to a nation and an area.

SUMMARY

Systems and techniques are disclosed herein that enable autonomous driving of a vehicle in an optimized manner.

In one aspect, a vehicle control device includes a communication unit configured to obtain a current position of a vehicle; a sensing unit configured to sense another vehicle subject to a driving regulation and obtain current position of the other vehicle; a processor; and a computer-readable medium coupled to the processor having stored thereon instructions which, when executed by the processor, causes the processor to perform operations comprising autonomously driving the vehicle based on the respective current positions of the vehicle and the other vehicle in compliance with the driving regulation.

Implementations may include one or more of the following features. For example, the sensing unit is configured to sense a type of the other vehicle. The operations include determining the driving regulation to be applied based on at least one the current position of the vehicle or the type of the other vehicle; and applying the determined driving regulation to the autonomous driving.

In some implementations, the operations include determining the type of the other vehicle to match one of a plurality of predetermined types of vehicles. The determining of the driving regulation includes determining a different driving regulation to be applied to the autonomous driving based on a respective driving regulation associated with the type of the other vehicle.

In some implementations, the respective driving regulation associated with the type of the other vehicle includes a first driving regulation or a second driving regulation. The first driving regulation is associated with the vehicle being located at a first area and the second driving regulation is associated with the vehicle being located at a second area, and the first and second driving regulations are different. The operations include determining whether the vehicle is located at the first area or the second area, based on a determination that the vehicle is located at the first area, applying the first driving regulation; and based on a determination that the vehicle is located at the second area, applying the second driving regulation.

In some implementations, the determining of the driving regulation to be applied to the autonomous driving is based on the type of the other vehicle.

In some implementations, wherein the type of the other vehicle includes a first type or a second type, and the first type is different from the second type. The driving regulation includes a first driving regulation associated with the first type or a second driving regulation associated with the second type, and the first and second driving regulations are different. The operations include determining whether the type of the other vehicle is the first type or the second type; based on a determination that the type of the other vehicle is the first type, applying the first driving regulation to the autonomous driving; and based on a determination that the type of the other vehicle is the second type, applying the second driving regulation to the autonomous driving.

In some implementations, the sensing unit is configured to sense additional information associated with the other vehicle. The operations include: determining that the additional information associated with the other vehicle is sensed; determining the driving regulation based on the sensed additional information; and applying the determined driving regulation to the autonomous driving.

In some implementations, the applying the determined driving regulation to the autonomous driving includes: determining to stop the vehicle based on the vehicle having a same direction of travel as the other vehicle; and stopping the vehicle at a predetermined distance from the other vehicle based on the determination to stop the vehicle.

In some implementations, the applying the determined driving regulation to the autonomous driving includes: determining that the additional information associated with the other vehicle is no longer sensed; and resuming movement of the vehicle at a speed less than or equal to a predetermined speed.

In some implementations, the operations include: determining that the vehicle is moving in a different direction with respect to the other vehicle; and autonomously driving the vehicle based on a number of lanes of a road on which the vehicle is located and the current position of the vehicle.

In some implementations, the operations include: determining whether the number of lanes of the road on which the vehicle is located is less than or equal to a predetermined number, based on a determination that the number of lanes of the road on which the vehicle is located is less than or equal to the predetermined number, stopping the vehicle at a predetermined distance from the other vehicle; and based on a determination that the number of lanes of the road on which the vehicle is located is greater than the predetermined number, stopping the vehicle or moving the vehicle at a speed less than or equal to a predetermined speed based on the current position of the vehicle and a presence of a median strip.

In some implementations, the operations include: determining that the sensed additional information is one of a plurality of predetermined specific sounds; and autonomously driving the vehicle to avoid a predetermined area around the other vehicle.

In some implementations, the sensed additional information is one of the plurality of predetermined specific sounds. The operations include: determining that the vehicle is moving in a different direction with respect to the other vehicle; determining a presence of a median strip; and autonomously driving the vehicle based on the determination of the presence of the median strip.

In some implementations, the vehicle control device includes a display unit. The vehicle is in a manual driving mode, and the operations include instructing the display unit to output information associated with the driving regulation.

In some implementations, the vehicle is currently located in a first state or a first country. The operations include: determining, based on the current position of the vehicle, that the vehicle is entering a second state or a second country different from the first state or the first country; and based on the determination that the vehicle is entering a second state or a second country, obtaining, through the communication unit, updated driving regulations corresponding to the second state or the second country.

In some implementations, the vehicle is moving along a planned route comprising two or more segments corresponding to different states or different countries. The operations include: obtaining, based on the planned route, driving regulations corresponding to different states or countries; and applying corresponding driving regulations to corresponding segments of the planned route.

In another aspect, a vehicle includes a plurality of wheels; a power source configured to drive the plurality of wheels; and a vehicle control device according to one or more of the foregoing implementations.

In yet another aspect, a method of controlling a vehicle includes: sensing, through a sensing unit, another vehicle subject to a driving regulation; obtaining, through a sensing unit, a current position of the other vehicle; obtaining, through a communication unit, a current position of the vehicle; and autonomously driving the vehicle based on the respective current positions of the vehicle and the other vehicle in compliance with the driving regulation.

According to an implementation of the present disclosure, there may be one or more of the following effects.

The present disclosure may provide an optimized control method capable of autonomously driving a vehicle in correspondence to a driving regulation.

The present disclosure may provide a control method capable of autonomously driving a vehicle in compliance with applicable driving regulations according to a country, a city and an area in which the vehicle the vehicle is currently located, and the presence of another vehicle to which the driving regulation is applicable.

The present disclosure may provide a control method capable of autonomously driving a vehicle according to a situation, based on a type of another vehicle to which a driving regulation is applied.

The present disclosure may provide a new user interface capable of outputting information related to a driving regulation in an optimized manner, based on a type of another vehicle sensed and a sensing area of said another vehicle.

All or part of the features described throughout this application may be implemented as a computer program product including instructions that are stored on one or more non-transitory machine-readable storage media, and that are executable on one or more processing devices. All or part of the features described throughout this application may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIG. 1 is a perspective view illustrating an example of a vehicle.

FIGS. 11-18 are conceptual views illustrating various control methods.

DETAILED DESCRIPTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the implementations presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an implementation of the present disclosure may be understood as a concept including cars, motorcycles and the like. Hereinafter, the vehicle will be described based on a car.

The vehicle according to the implementation of the present disclosure may include an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a perspective view illustrating an example of a vehicle.

Figure 2:
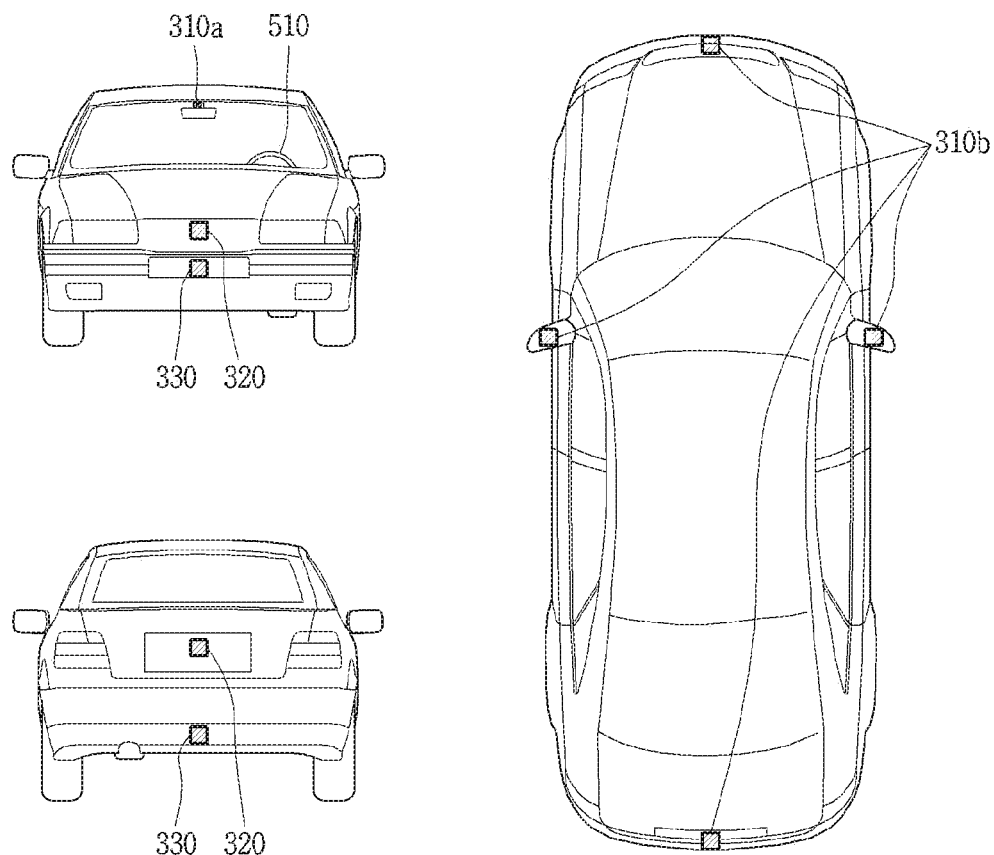
FIG. 2 is a view illustrating an example of a vehicle at various angles.

FIG. 2 is a view illustrating an example of a vehicle at various angles.

Figure 3:
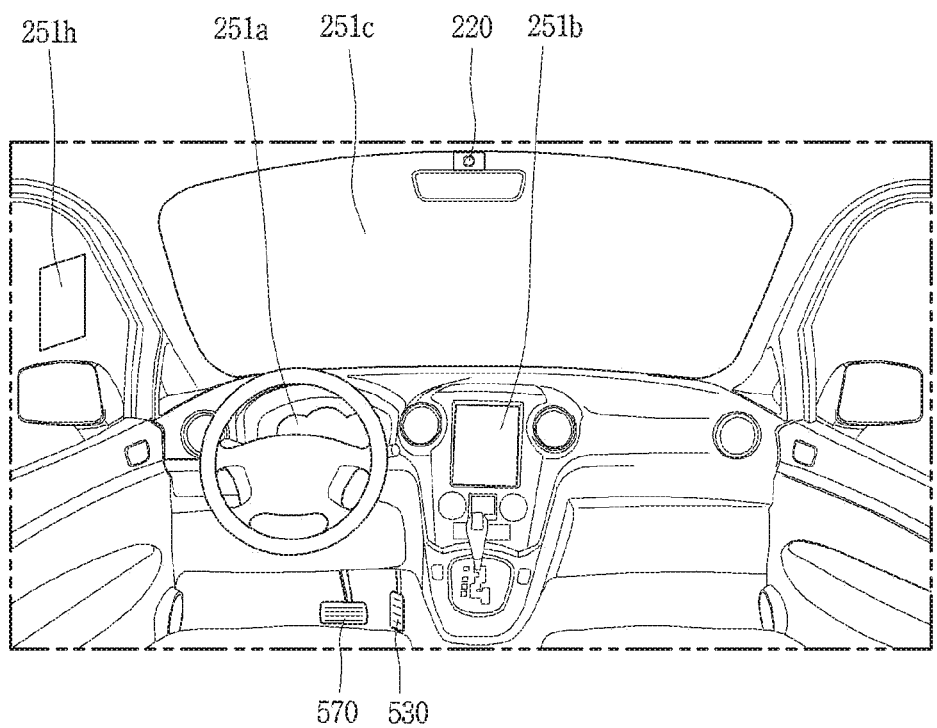
FIGS. 3 and 4 are views illustrating an interior portion of an example of a vehicle.
Figure 4:
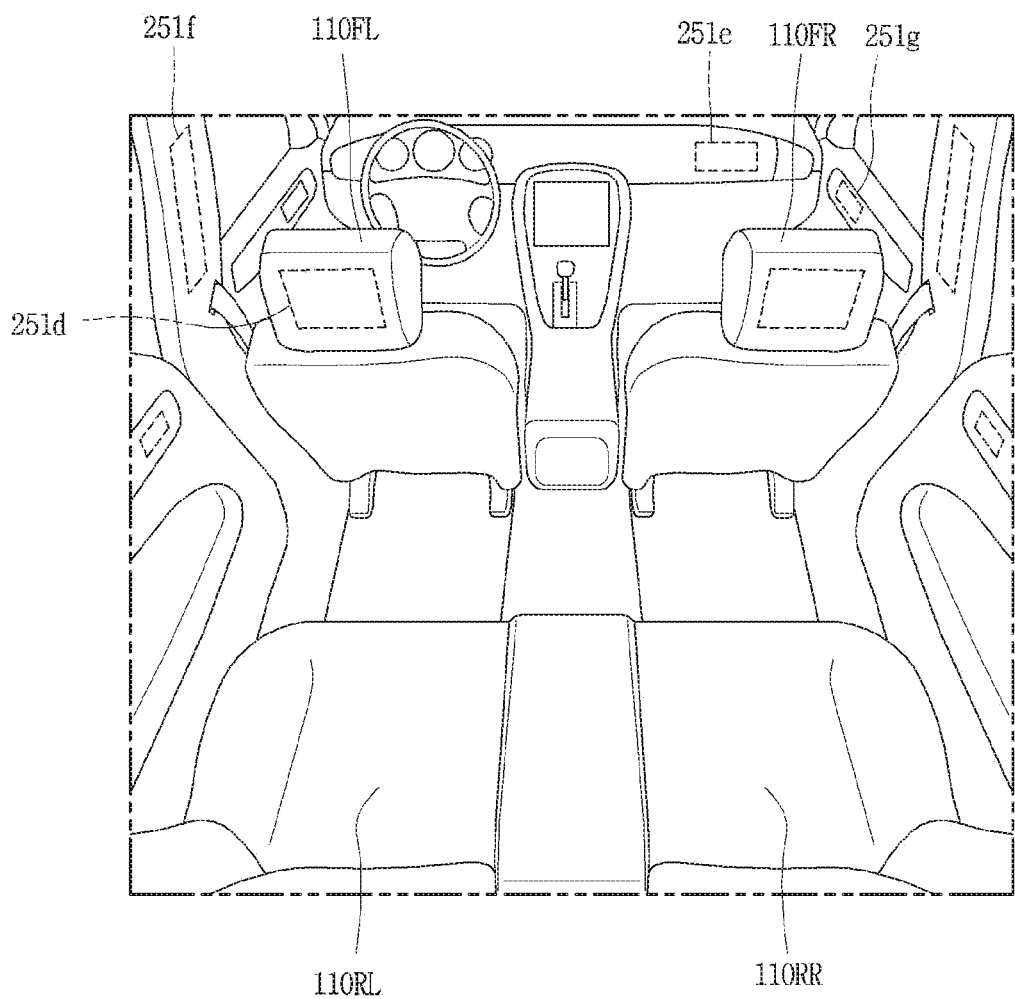

FIGS. 3 and 4 are views illustrating an interior portion of an example of a vehicle.

Figure 5:
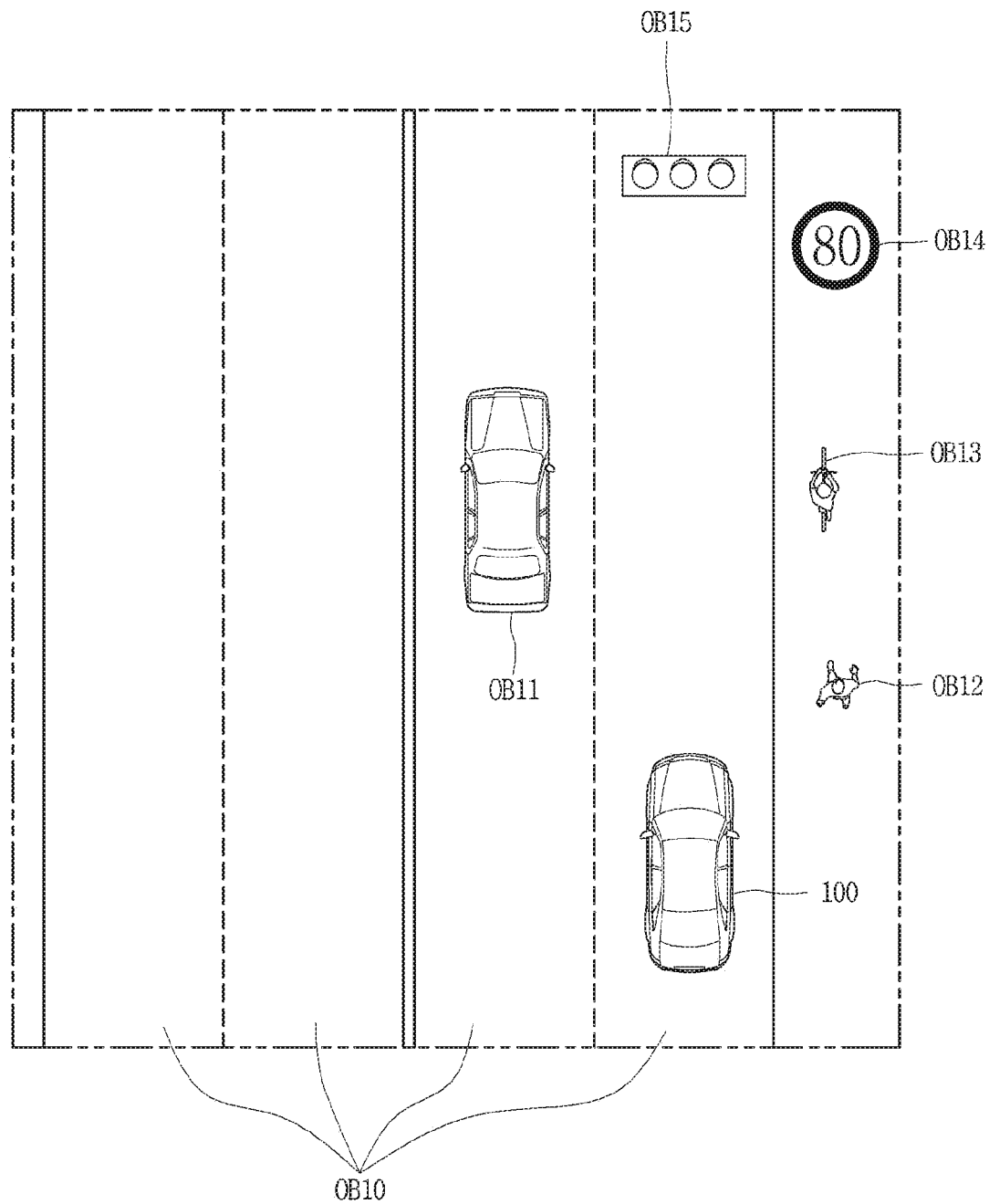
FIGS. 5 and 6 are reference views illustrating examples of objects that are relevant to driving.
Figure 6:
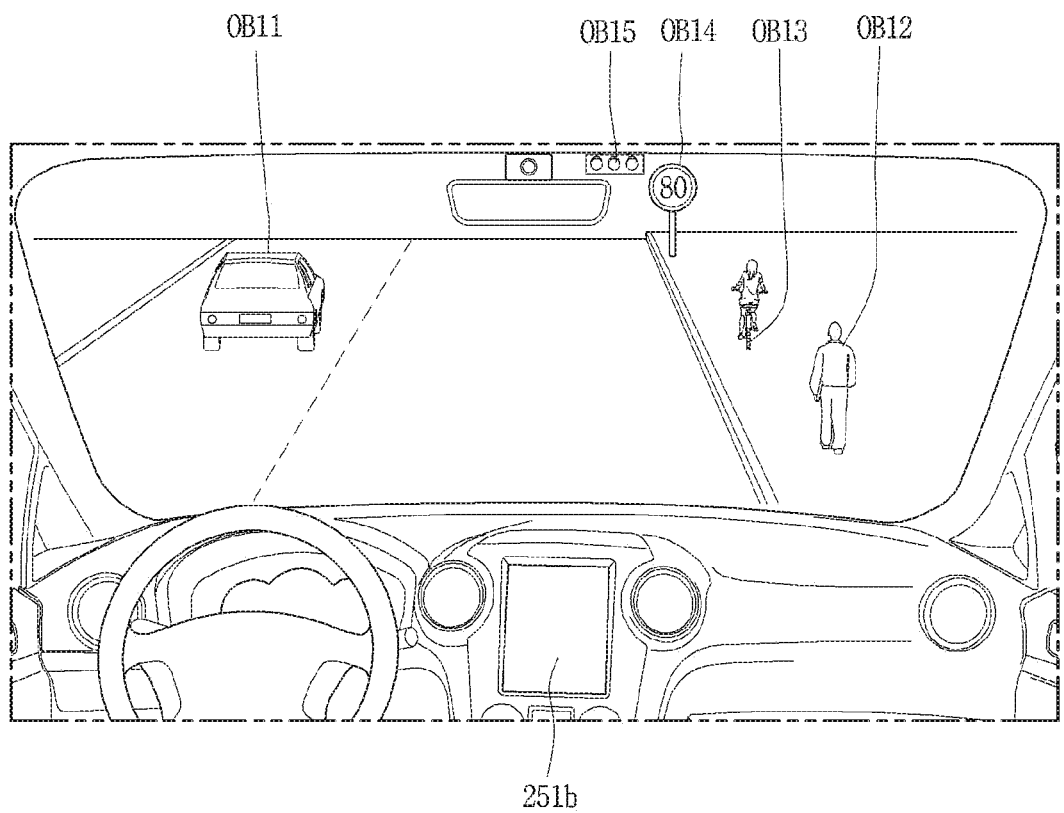

FIGS. 5 and 6 are reference views illustrating examples of objects that are relevant to driving.

Figure 7:
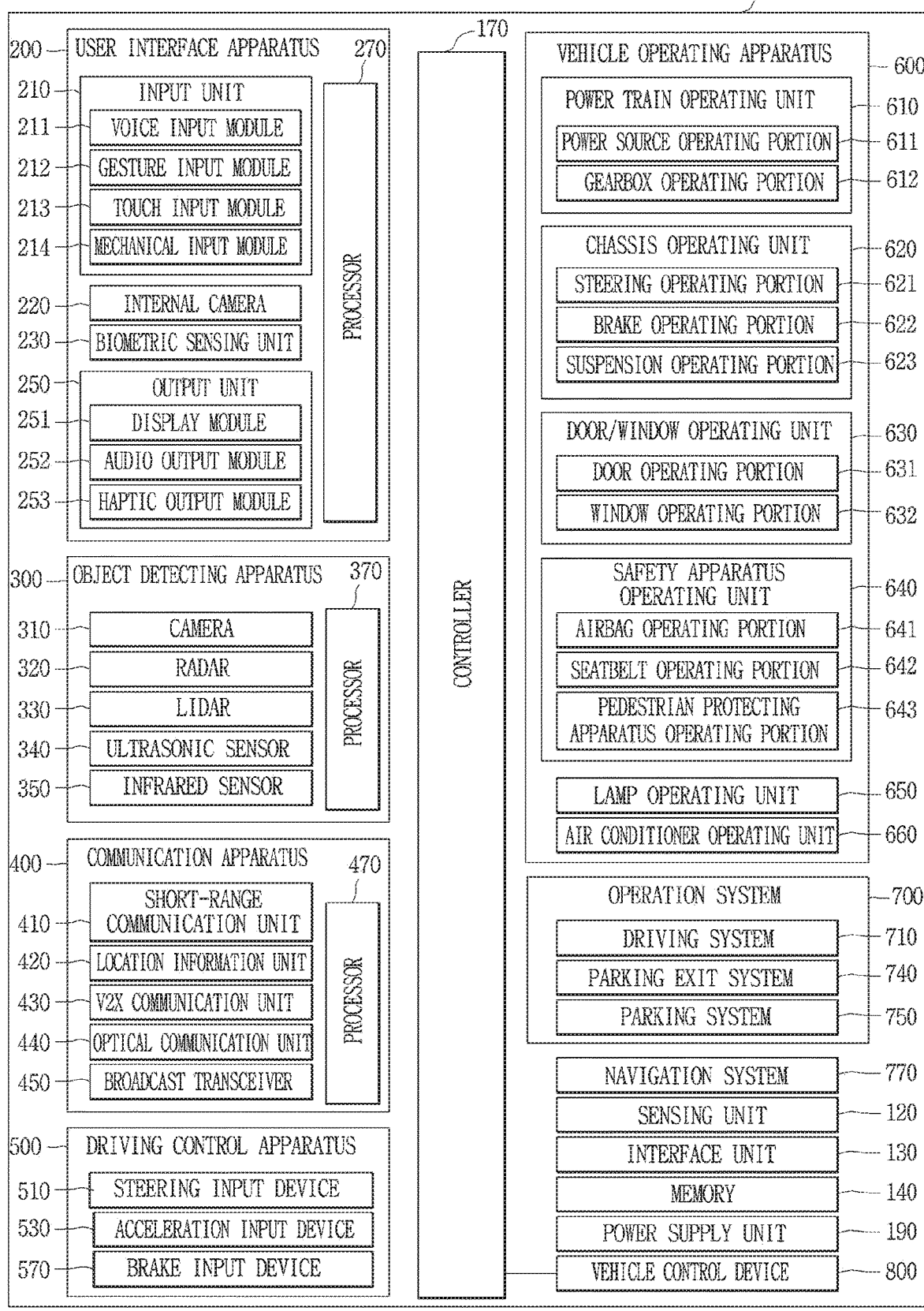
FIG. 7 is a block diagram illustrating subsystems of an example of a vehicle.

FIG. 7 is a block diagram illustrating subsystems of an example of a vehicle.

Referring to FIGS. 1-7, a vehicle 100 may include wheels driven by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle operation mode may be switched from a manual mode into an autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (U Is) or user experiences (UXs) through the user interface apparatus 200.

The user interface apparatus 200 may include an input unit 210, an internal camera 220, a biometric sensing unit 230, an output unit 250 and a processor 270.

According to implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like. Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370. According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled.

The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device. The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100.

For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be securely seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to implementations, the operation system 700 may further include other components in addition to components to be described, or may not include some of the components to be described.

Meanwhile, the operation system 700 may include a processor. Each unit of the operation system 700 may individually include a processor.

According to implementations, the operation system may be a sub concept of the controller 170 when it is implemented in a software configuration.

Meanwhile, according to implementation, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to implementations, the navigation system 770 may update pre-stored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, components of the vehicle control device 800 according to an implementation of the present disclosure will be explained in more detail with reference to the attached drawings.

Figure 8:
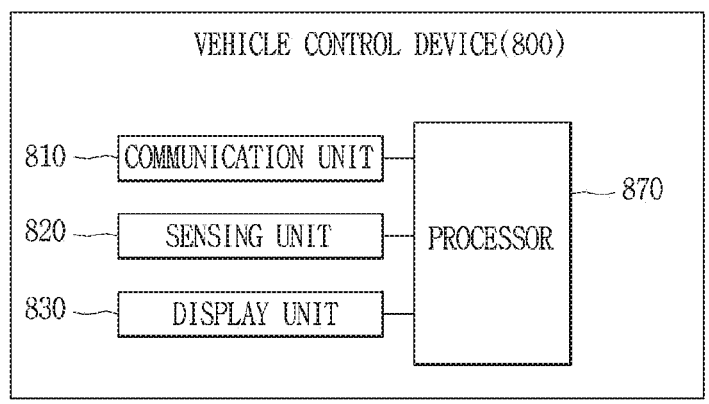
FIG. 8 is a block diagram of a vehicle control device.

FIG. 8 is a block diagram of a vehicle control device.

Referring to FIG. 8, the vehicle control device 800 according to an implementation of the present disclosure may include a communication unit 810, a sensing unit 820, a display unit 830, a processor 870, etc.

The communication unit 810 may be the aforementioned communication apparatus 400. The communication unit 810 may perform communication with a nearby vehicle (or other vehicle). This may be referred to as vehicle to vehicle (V2V) communication. The V2V communication may be defined as a technology to exchange information between automobiles, by which a position of a nearby car, speed information, etc. can be shared.

The communication unit 810 may perform communication with all types of communicable devices (e.g., a mobile terminal, a server, etc.) This may be referred to as vehicle to everything (V2X) communication. The V2X communication may be defined as a technology to check road infra while driving, and to exchange or share information on a traffic situation while communicating with other vehicle.

The V2V communication may be understood as an example of the V2X communication, or as a concept included in the V2X communication.

The processor 870 may perform V2V communication or V2X communication with a nearby vehicle (other vehicle) through the communication unit 810.

More specifically, the processor 870 may request driving-related information from a nearby vehicle through the communication unit 810, and then may receive the driving-related information from the nearby vehicle.

The nearby vehicle may mean at least one of a vehicle which exists within a predetermined distance on the basis of the vehicle 100, and a vehicle which is entering a predetermined distance on the basis of the vehicle 100.

The present disclosure is not limited to this, and the nearby vehicle may include all types of vehicles which can perform communication with the communication unit 810 of the vehicle 100. For convenience, it is assumed in this specification that the nearby vehicle is a vehicle which exists within a predetermined distance from the vehicle 100, or a vehicle which is entering the predetermined distance, The predetermined distance may be determined based on a communicable distance through the communication unit 810, a specification of a product, or a user's setting.

The driving-related information may include all types of information related to driving of a nearby vehicle.

For instance, the information related to driving of a nearby vehicle may include intention information, basic information, additional information, etc.

The intention information may include a predicted path, a predicted direction, a predicted speed, etc. of the nearby vehicle. Also, the intention information may further include path information set to the nearby vehicle, destination information or information on a lane change reason, a camera image provided at the nearby vehicle, etc.

The basic information may mean information related to the nearby vehicle. For instance, the basic information may include a current speed of the nearby vehicle, an acceleration, a deceleration, a steering wheel angle, information on whether a flicker is turned on or not, information on whether an emergency indicator (light) is turned on or not, etc.

The additional information may mean information related to various functions executable in the nearby vehicle. For instance, the additional information may include a bookmarked place of the nearby vehicle, a destination, social network service (SNS) information, and the like.

The processor 870 of the vehicle may receive the driving-related information from the nearby vehicle through V2X communication or V2V communication using the communication unit 810.

Here, the driving-related information may be information indicating a driving intention of the nearby vehicle, or may be processed into information indicating the driving intention by a predetermined algorithm (or a specific program, an application) of the processor 870.

That is, in the present disclosure, it is possible to predict (estimate) a driving type of a nearby vehicle based on information received through the communication unit. Such prediction may mean a driving intention of the nearby vehicle.

In the present specification, information related to driving of a nearby vehicle may mean driving prediction information of the nearby vehicle or a driving intention of the nearby vehicle.

Further, the information related to driving of a nearby vehicle may include at least one of a current driving route of the nearby vehicle, a predicted driving route, a current driving speed, a predicted driving speed, a current driving direction and a predicted driving direction. This may be understood as a driving prediction of the nearby vehicle or a driving intention of the nearby vehicle.

Further, the communication unit 810 of the present disclosure may determine a current position of the vehicle by the location information unit 420. The processor 870 may determine a driving regulation to be considered based on an area (or a country, a state, a city, a province, etc.) in which the vehicle is currently located.

The driving regulation may mean laws related to various aspects of driving of vehicles to be obeyed by the vehicles. For example, the driving regulation may include a speed limitation, stopping or driving at a constant speed or less (slowing down) near a specific object, etc.

The sensing unit 820 of the vehicle control device 800 according to the present disclosure may be the object detecting apparatus 300 described in FIG. 7, or the sensing unit 120 provided at the vehicle 100.

The sensing unit 820 may be independent from the object detecting apparatus 300 provided at the vehicle 100, or the sensing unit 120 provided at the vehicle 100. Even if the sensing unit 820 is an independent sensing unit, the sensing unit 820 may include the characteristics of the sensing unit 120 shown in FIG. 7 or the object detecting apparatus 300.

The sensing unit 820 may include the camera 310 described with reference to FIG. 7.

The sensing unit 820 may be implemented by combining at least two of the camera 310, the radar 320, the LiDAR 330, the ultrasonic sensor 340, the infrared sensor 350 and the sensing unit 120 included in the object detecting apparatus 300.

The sensing unit 820 may sense an object near the vehicle 100, and may sense information related to the object.

For example, the object may include the aforementioned nearby vehicle, a nearby person, a surrounding object, a surrounding terrain, and the like.

The sensing unit 820 may sense information related to the vehicle 100 of the present disclosure.

The information related to the vehicle may be at least one of vehicle information (or a driving state of the vehicle) and surrounding information of the vehicle.

For example, the vehicle information may include a driving speed of the vehicle, a weight of the vehicle, a number of persons in the vehicle, a braking force of the vehicle, a maximum braking force of the vehicle, a driving mode of the vehicle (an autonomous driving mode or a manual driving mode), a parking mode of the vehicle (an autonomous parking mode, an automatic parking mode or a manual parking mode), whether a driver is in the vehicle or not, information about the driver (e.g., whether the driver has been authenticated or not), etc.

The surrounding information of the vehicle, for example, may include a state (frictional force) of a road surface on which the vehicle is currently moving, the weather, a distance from a front (or rear) vehicle, a relative speed of a front (or rear) vehicle, a curvature of a curve when a currently-driving lane is curved, a surrounding brightness of the vehicle, information about an object which exists within a reference region (predetermined region) on the basis of the vehicle, whether an object has entered or moved out of the predetermined region, whether a user exists near the vehicle or not, information about the driver (e.g., whether the driver has been authenticated or not), etc.

Also, the surrounding information of the vehicle (or surrounding environment information) may include external information of the vehicle (e.g., ambient brightness, temperature, a position of the sun, information regarding subjects around the vehicle (e.g., persons, other vehicles, traffic signs, etc.), a type of a currently-driving road surface, a feature (landmark), line information, driving lane information, and information required for an autonomous driving/ autonomous parking/automatic parking/manual parking mode.

The surrounding information of the vehicle may further include a distance between the vehicle 100 and an object present near the vehicle, a type of the object, an available parking space for the vehicle, an object (e.g., a parking line, a string, another vehicle, a wall, etc.) for identifying a parking space, and the like.

Hereinafter, descriptions will be given under an assumption that the sensing unit 820 is separately provided in the vehicle control device 800. Obtaining information by the processor 870 through the sensing unit 820 may be understood as acquiring information by the processor 870 using at least one of the object detecting apparatus 300 and the sensing unit 120 provided in the vehicle 100.

The vehicle control device 800 according to the present disclosure may include a display unit 830.

The display unit 830 may be the output unit 250 and the display unit 251 shown in FIG. 7. The display unit 830 may include an output unit (e.g., a touch screen) of a mobile terminal that can communicate with the communication apparatus 400.

As described above, the display unit 830 may be implemented as a Head Up Display (HUD).

In addition, the display portion 830 may include a transparent display. The transparent display may be attached to a windshield or a window.

The display unit 830 may be located on one area of a steering wheel, one area 251a, 251b or 251e of an instrument panel, one area 251d of a seat, one area 251f of each pillar, one area 251g of a door, one area of a center console, one area of a head lining, one area of a sun visor, one area 251c of a windshield, or one area 251h of a window.

The vehicle control device 800 of the present disclosure may include the processor 870 capable of controlling the communication unit 810, the sensing unit 820, the display unit 830, and the like.

In some implementations, the processor 870 may be the controller 170 described with reference to FIG. 7.

In some implementations, the processor 870 may control the components described in FIG. 7 and the components described in FIG. 8.

In some implementations, the processor 870 may control the vehicle 100 to be autonomously driven. For example, the processor 870 may control the vehicle 100 to be autonomously driven based on information sensed through the sensing unit 820 and information received through the communication unit 810.

In some implementations, the processor 870 included in the vehicle control device 800 of the present disclosure may control the sensing unit 810 to sense surrounding information of the vehicle 100.

In some implementations, the processor 870 may control the sensing unit 820 to sense another vehicle to which a driving regulation is applied.

In some implementations, once said another vehicle to which a driving regulation is applied is sensed, the processor 870 may determine a current position of the vehicle through the communication unit 810.

Then, the processor 870 may control the vehicle 100 to be autonomously driven in correspondence to a preset driving regulation, based on a current position of said another vehicle to which a driving regulation is applied and the vehicle. Hereinafter, various methods for autonomously driving the vehicle in correspondence to a driving regulation according to the present disclosure will be explained in more detail with reference to the accompanying drawings.

Figure 9:
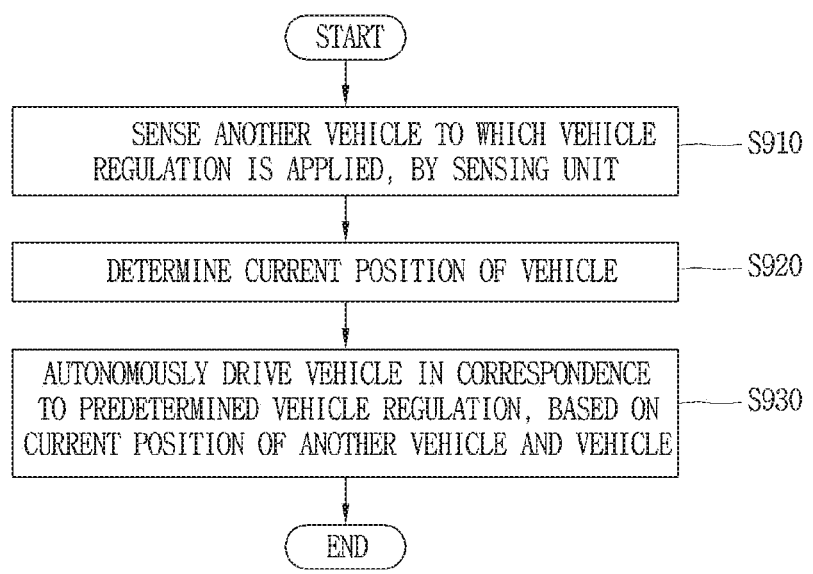
FIG. 9 is a flowchart illustrating an example of a method for controlling a vehicle.

FIG. 9 is a flowchart illustrating an example of a method for controlling a vehicle.

Figure 10:
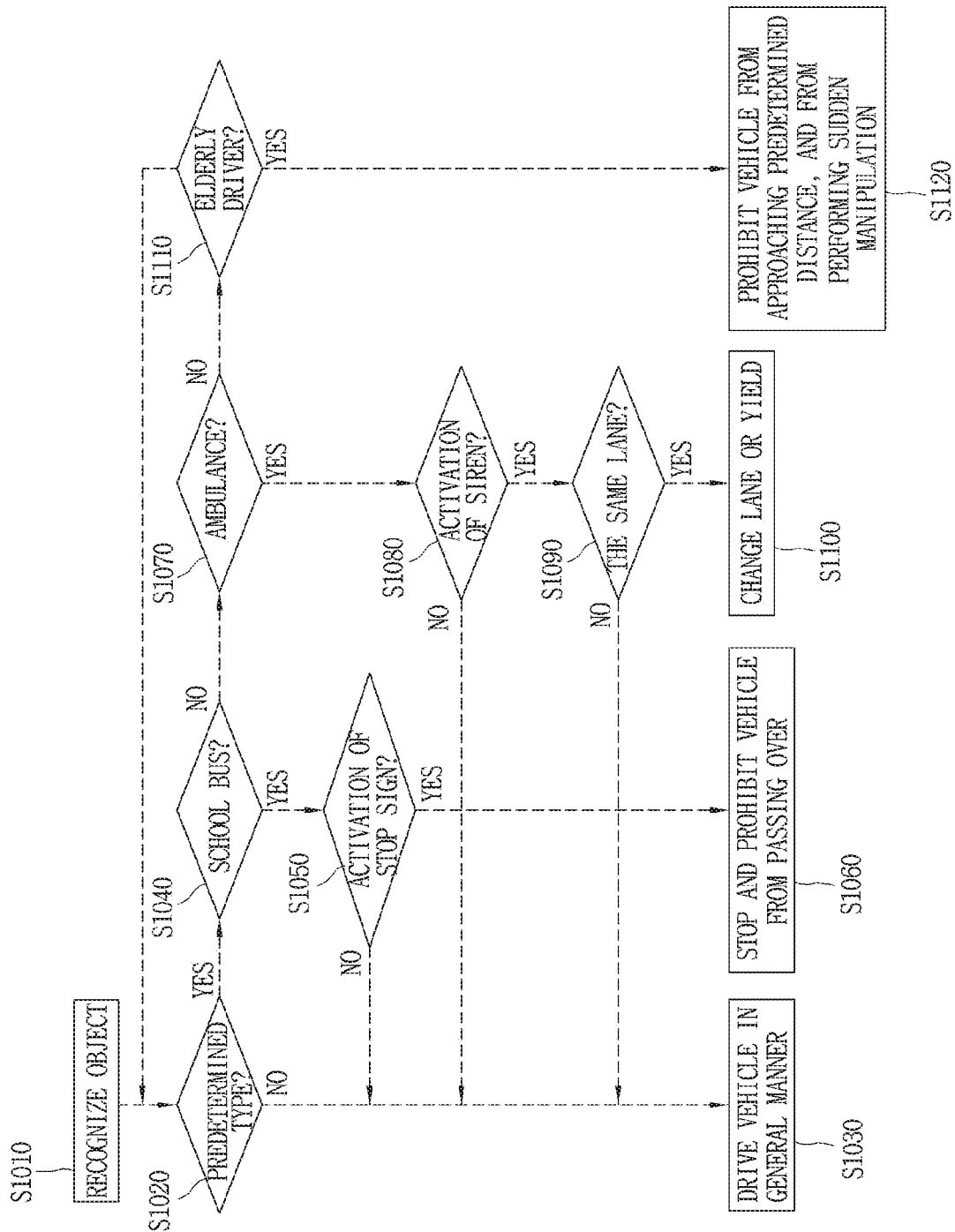
FIG. 10 is a flowchart illustrating another example of a method for controlling a vehicle.

FIG. 10 is a flowchart illustrating another example of a method for controlling a vehicle.

FIGS. 11-18 are conceptual views illustrating various control methods.

All explanations to be described below may be applied to a manual driving mode, an autonomous (automatic) driving mode, or both.

Referring to FIG. 9, another vehicle to which driving regulation is applied is sensed by the sensing unit 820 (S910).

Specifically, the processor 870 may sense an object by using the sensing unit 820 (e.g., the camera 310, the radar 320, the lidar 330, the ultrasonic sensor 340, the infrared sensor 350, etc.) while the vehicle is operating.

The processor 870 may determine whether the sensed object is another vehicle to which a driving regulation is applied. For example, the processor 870 may determine whether the sensed object is another vehicle to which a driving regulation is applied, based on a shape, a color or a size of the sensed object as determined from an image corresponding to the sensed object among images received through the camera.

The driving regulation may mean a regulation that requires an additional regulation in driving the vehicle 100. For example, the driving regulation may be regulated legally to stop the vehicle at a predetermined distance from said another vehicle, or to drive the vehicle at a predetermined speed or less within a predetermined distance (or within a predetermined region).

Examples of the other vehicle to which a driving regulation is applied include an object of a driving regulation for an additional control required to drive the vehicle 100.

Other examples of the other vehicle to which a driving regulation is applied include a school bus, a vehicle that sounds a siren (for example, a police car, an ambulance, a fire truck), a vehicle driven by a driver who is more than a predetermined age (e.g., a vehicle to which a silver mark has been attached), etc.

In general, the other vehicle to which a driving regulation of the present specification is applied may include all types of vehicles which require an additional regulation in driving the vehicle 100 (e.g., stopping, avoiding, decelerating, slowing down, etc.).

Then, a current position of the vehicle is determined (3920).

Specifically, if said another vehicle to which a driving regulation is applied is sensed, the processor 870 may control the communication unit 810 to determine a current position of the vehicle.

For example, the processor 870 may determine a current position of the vehicle 100 based on GPS information received through the communication unit 810.

The processor 870 may determine an area (e.g., a country, a state, a city, a city, a province, etc.) in which the vehicle is currently located.

Then, the vehicle is autonomously driven in correspondence to a predetermined driving regulation, based on a current position (or an area including the current position) of the other vehicle to which a driving regulation is applied and the vehicle (S930).

The predetermined driving regulation may be determined based on at least one of an area including a current position of the vehicle and the type of the other sensed vehicle.

In some implementations, the driving regulation may change, for a same type of sensed vehicle, based on the area in which the vehicle 100 is currently located.

For example, if a first vehicle of a first type is located at a first area where a first driving regulation is applied, the processor 870 may autonomously drive the vehicle 100 in correspondence to the first driving regulation (by applying the first driving regulation).

As another example; if the first vehicle of the first type is located at a second area where a second driving regulation different from the first driving regulation is applied, the processor 870 may autonomously drive the vehicle 100 in correspondence to the second driving regulation (by applying the second driving regulation).

In some implementations, driving regulations corresponding to different areas (e.g., a country, a state, a city, a city, a province, etc.) may be updated based on the current location of the vehicle. For example, the vehicle is currently located in a first state or a first country; and is entering a second state or a second country different from the first state or the first country. In such a situation updated driving regulations corresponding to the second state or the second country may be obtained, for example, through the communication unit.

In some implementations, driving regulations may be updated based on a planned route of the vehicle. For example, a planned route may include two or more segments corresponding to different states or different countries. In such a situation, driving regulations corresponding to the different states or countries may be updated, and the obtained driving regulations may be applied to corresponding segments of the planned route.

The driving regulation may also become different according to a type of sensed vehicle to which the driving regulation is applied. For example, a first driving regulation may be applied to a first type of another vehicle (for example, a school bus) to which a driving regulation is applied. And a second driving regulation different from the first driving regulation may be applied to a second type of sensed vehicle (for example, an ambulance) to which a driving regulation is applied.

In this manner, information related to a driving regulation applied according to an area or a type of another vehicle may be stored in a memory. If another vehicle to which a driving regulation is applied is sensed and a current position of the vehicle 100 is determined, the processor 870 may apply a preset driving regulation corresponding to a type of said another vehicle and the current position of the vehicle, based on the information related to a driving regulation.

That is, the preset driving regulation may be determined based on a type of another vehicle sensed and a current position (or an area including the current position) of the vehicle 100.

Specifically, if a specific type of another vehicle (for example, a school bus) is sensed, the processor 870 may autonomously drive the vehicle 100 in correspondence to a different driving regulation, based on a position of the vehicle 100 where a driving regulation applied to said another vehicle is applied.

For example, if the vehicle 100 is located at a first area where a first driving regulation for the specific type of another vehicle is applied, the processor 870 may autonomously drive the vehicle 100 in correspondence to the first driving regulation.

As another example, if the vehicle 100 is located at a second area where a second driving regulation for the specific type of another vehicle (the second driving regulation different from the first driving regulation) is applied, the processor 870 may autonomously drive the vehicle 100 in correspondence to the second driving regulation when said another vehicle is sensed.

Figure 11A:
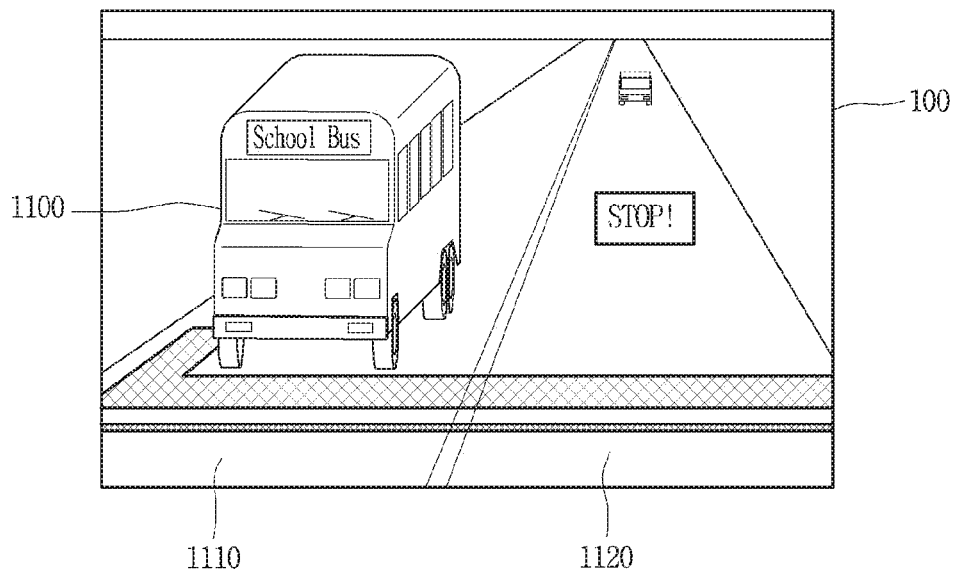
Figure 11B:
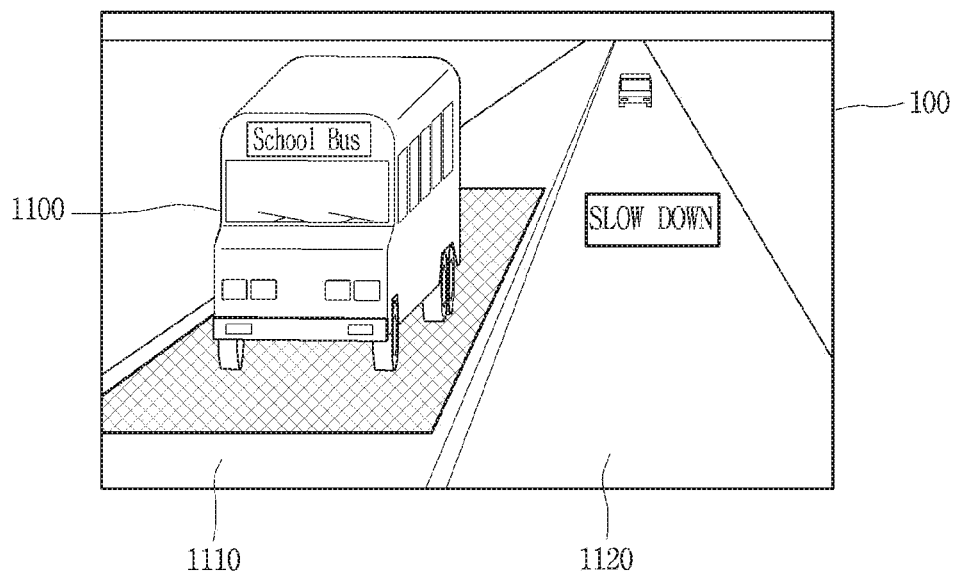

Referring to FIGS. 11A-B, a specific type of another vehicle 1100 (for example, a school bus) may be an object (vehicle) to which a driving regulation is applied. That is, the specific type of another vehicle 1100 may correspond to a driving regulation object requiring an additional control in driving the vehicle 100.

To the specific type of another vehicle 1100, a first driving regulation may be applied at a first region, and a second driving regulation different from the first driving regulation may be applied at a second region different from the first region.

For example, as shown in FIG. 11A, if the specific type of another vehicle 1100 has been sensed by the vehicle 100 and a current position of the vehicle 100 is included in an area where a first driving regulation for the sensed specific type of another vehicle 1100 (for example, when moving in an opposite direction to said another vehicle, the vehicle 100 should be stopped before passing over said another vehicle 1100) is applied, the processor 870 may autonomously drive the vehicle 100 in correspondence to the first driving regulation.

As another example, as shown in FIG. 11B, if a current position of the vehicle 100 is included in an area where a second driving regulation different from the first driving regulation for the specific type of another vehicle 1100 (for example, when moving in an opposite direction to said another vehicle, the vehicle 100 should move at a predetermined speed or less) is applied, the processor 870 may autonomously drive the vehicle 100 in correspondence to the second driving regulation.

Each of the first driving regulation and the second driving regulation may be a preset driving regulation determined based on a type of another vehicle to which a driving regulation is applied and a current position (or area) of the vehicle. As another example, as shown in FIGS. 12A-B, even if a road on which the vehicle 100 is moving includes a plurality of lanes 1110, 1120 and a median strip 1130 where passage of a vehicle is prohibited, a different driving regulation may be applied to another vehicle according to an area.

Figure 12A:
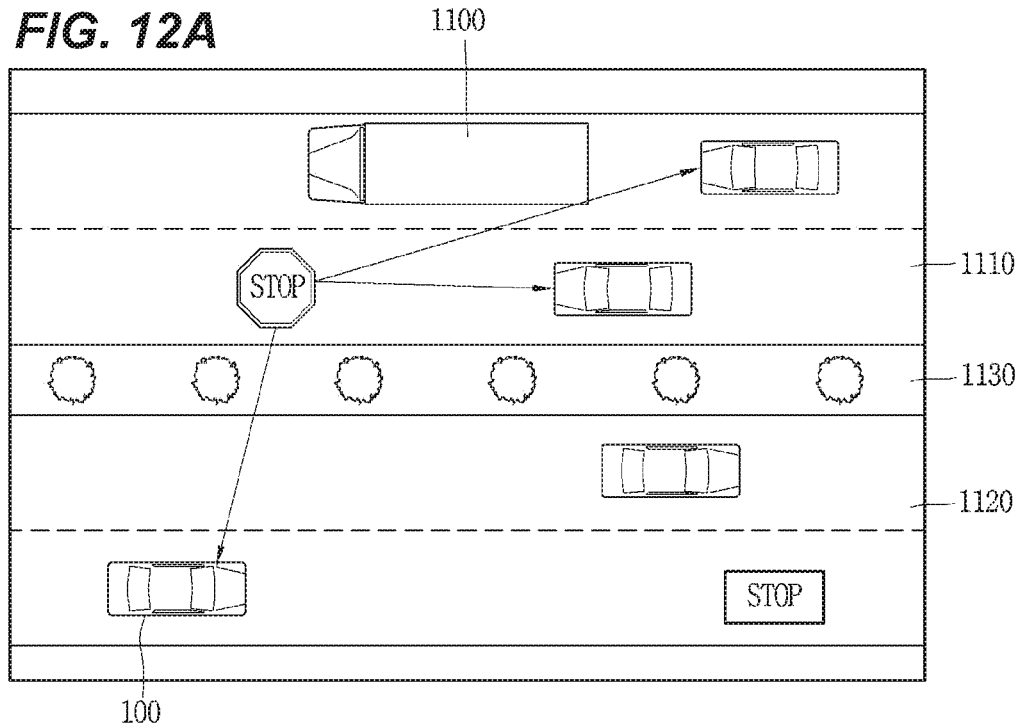

For example, as shown in FIG. 12A, in a case where a median 1130 exists and a driving direction of another vehicle 1100 (for example, a school bus) on a lane 1110 is opposite to a driving direction of the vehicle 100 on a lane 1120, a predetermined driving regulation may be applied such that the vehicle may stop without passing over said another vehicle 1100 at a first area.

In this case, the processor 870 may apply the predetermined driving regulation such that the vehicle may stop before passing over said another vehicle 1100, even if a current position of the vehicle 100 is the first area, the median strip 1130 exists, and a driving direction of said another vehicle 1100 is opposite to a driving direction of the vehicle 100. Then, after said another vehicle 1100 starts moving, the processor 870 may control the vehicle 100 to start moving.

Figure 12B:
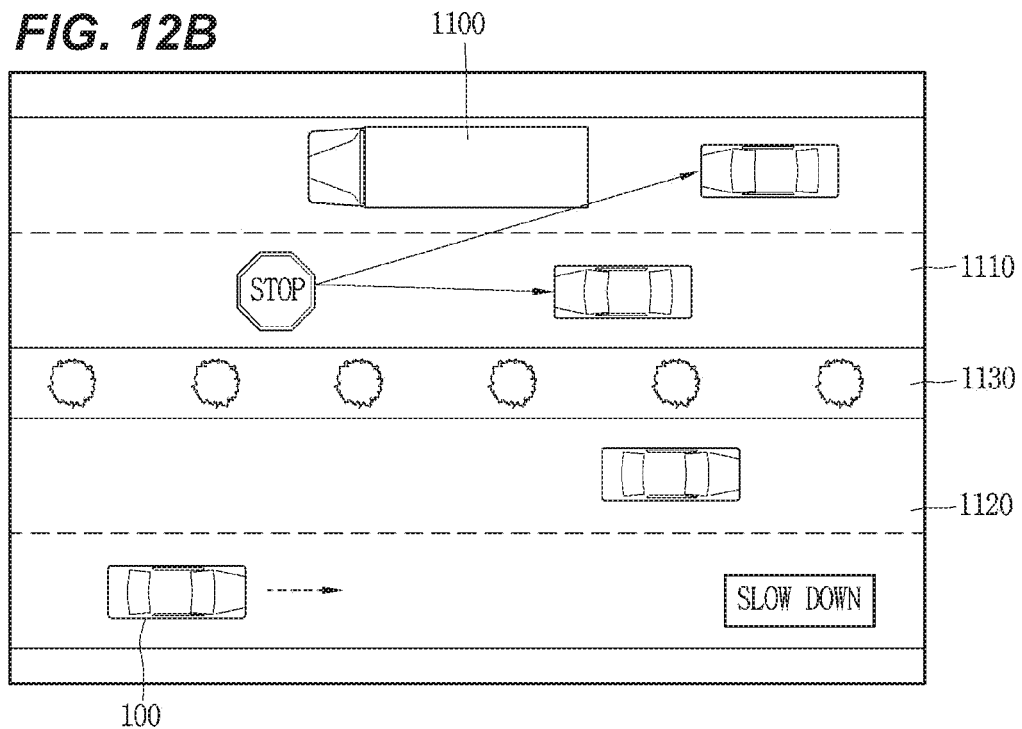

As another example, as shown in FIG. 12B, in a case where a median 1130 exists and a driving direction of another vehicle 1100 on a lane 1110 is opposite to a driving direction of the vehicle 100 on a lane 1120, a predetermined driving regulation may be applied such that the vehicle may move at a predetermined speed or less at a second area.

In this case, the processor 870 may apply the predetermined driving regulation such that the vehicle may move at a predetermined speed or less (slow down), even if a current position of the vehicle 100 is the second area, the median strip 1130 exists, and a driving direction of said another vehicle 1100 is opposite to a driving direction of the vehicle 100.

As shown in FIGS. 12A and 12B, if a driving direction of the vehicle is the same as that of said another vehicle 1100 (and if said another vehicle 1100 is in a stopped state), a predetermined driving regulation may be commonly applied to the first and second areas, such that the vehicle may be stopped before passing over said another vehicle 1100 (or at a predetermined distance spaced from a rear side of said another vehicle).

In this case, if a driving direction of the vehicle is the same as that of said another vehicle 1100, the processor 870 may apply the predetermined driving regulation, such that the vehicle may be stopped before passing over said another vehicle 1100, based on a stopped state of the sensed another vehicle 1100. Then, after said another vehicle 1100 starts moving, the processor 870 may control the stopped vehicle 100 to start moving.

As described above, the present disclosure may provide a control method of autonomously driving a vehicle in an optimized manner according to a driving regulation at an area where the vehicle (or another vehicle sensed) is located, even if the same another vehicle (that is, another vehicle to which the same driving regulation is applied) is sensed.

The vehicle control device according to the present disclosure may be configured to autonomously drive the vehicle in correspondence to a different driving regulation, based on a type of another vehicle sensed by the sensing unit 820 (i.e., another vehicle to which a driving regulation is applied).

The processor 870 of the vehicle control device 800 according to the present disclosure may autonomously drive the vehicle in correspondence to a different driving regulation, based on a type of another vehicle sensed by the sensing unit 820 (another vehicle to which a driving regulation is applied).

That is, if a type of another vehicle to which a driving regulation is applied is changed, a control method to be added while the vehicle 100 is moving, may be changed.

If a first type of another vehicle to which a driving regulation is applied is sensed, the processor 870 may autonomously drive the vehicle in correspondence to a first driving regulation.

If a second type of another vehicle to which a driving regulation is applied and different from the first type of another vehicle is sensed, the processor 870 may autonomously drive the vehicle 100 in correspondence to a second driving regulation different from the first driving regulation.

Referring to FIG. 10, the processor recognizes an object (S1010).

More specifically; the processor 870 may recognize an object which exists within a predetermined distance from the vehicle using the sensing unit 870, The processor determines whether the recognized object matches with a predetermined type of vehicle (S1020).

Here, the predetermined type of vehicle may refer to types of vehicles to which the driving regulation described in the present specification is applied. If the sensed object(s) do not match with any of the predetermined types of vehicle, the processor 870 may autonomously drive the vehicle 100 based on a predetermined algorithm.

On the other hand, if the sensed object matches with a predetermined types of vehicle, the processor 870 may autonomously drive the vehicle in correspondence to a driving regulation corresponding to the predetermined type of vehicle.

Here, the processor 870 may autonomously drive the vehicle in correspondence to a different driving regulation, based on a type of the sensed other vehicle (specific vehicle).

For example, upon sensing of a first type of another vehicle (e.g., a school bus) to which a driving regulation is applied (S1040), the processor 870 may autonomously drive the vehicle in correspondence to a first driving regulation related to the first type of another vehicle (S1060). Here, the processor 870 may stop the vehicle or prohibit the vehicle from passing over said another vehicle, by applying the first driving regulation.

As another example, upon sensing of a second type of another vehicle (e.g., an ambulance or a vehicle driven by an elderly person) to which a driving regulation is applied and different from the first type of another vehicle (S1070, S1110), the processor 870 may autonomously drive the vehicle in correspondence to a second driving regulation related to the second type of another vehicle (31100, S1120). Here, the processor 870 may apply the second driving regulation to change a lane of the vehicle, to enter a shoulder of a road to yield to said another vehicle, to make the vehicle not approach (enter) a predetermined distance, or to make the vehicle not to perform a drastic vehicle manipulation (e.g., sudden braking, sudden acceleration, sudden steering change, etc.).

Each of the first driving regulation and the second driving regulation may be a preset driving regulation determined based on a type of another vehicle to which a driving regulation is applied and a current position (or area) of the vehicle.

If preset additional information is sensed from another vehicle to which a driving regulation is applied (S1050 or S1080 or S1090), the processor 870 may autonomously drive the vehicle 100 in correspondence to a predetermined driving regulation.

Here, the preset additional information may be related to a state of said another vehicle to which a driving regulation is applied.

For example, when said another vehicle is a first type of another vehicle (for example, a school bus), the first type of another vehicle may be equipped with a stop sign.

The stop sign may be disposed in parallel to a side surface of the first type of another vehicle (an inactivated state of the stop sign), or may be disposed to be perpendicular to the side surface of the first type of another vehicle. If the stop sign is disposed to be perpendicular to the side surface of the first type of another vehicle (an activated state of the stop sign), it may mean that a surrounding vehicle of said another vehicle should be stopped.

If preset additional information is sensed from another vehicle sensed (e.g., the stop sign is disposed to be perpendicular to the side surface of said another vehicle, i.e., an activated state of the stop sign) (S1050), the processor 870 may autonomously drive the vehicle 100 in correspondence to a driving regulation applied to the said another vehicle (S1060), If another vehicle to which a driving regulation is applied is sensed whereas preset additional information is not sensed from said another vehicle (S1050) (for example, a stop sign is in an inactivated state), the processor 870 may autonomously drive the vehicle 100 in a general manner according to a preset algorithm (S1030).

The preset additional information may include a plurality of information.

For example, if a plurality of preset additional information is sensed from another vehicle to which a driving regulation is applied, the processor 870 may autonomously drive the vehicle in correspondence to a preset driving regulation applied to said another vehicle.

As one example, if said another vehicle is a second type of another vehicle (for example, a vehicle which sounds a siren, an ambulance, a police car, a fire truck, etc.), the plurality of preset additional information may include information indicating whether said another vehicle sounds a siren, and information indicating whether said another vehicle and the vehicle are moving on the same lane.

If the plurality of preset additional information is sensed from said another vehicle, the processor 870 may autonomously drive the vehicle in correspondence to a driving regulation applied to said another vehicle (S1100).

On the other hand, if at least one of the plurality of preset additional information is not sensed from said another vehicle (S1080 or S1090), the processor 870 may autonomously drive the vehicle 100 in a general manner according to a preset algorithm.

However, the present disclosure is not limited to this. That is, even if only at least one of the plurality of preset additional information is sensed from said another vehicle, the processor 870 may autonomously drive the vehicle 100 in correspondence to a driving regulation applied to said another vehicle.

Referring to FIG. 12A, if the vehicle 100 and a sensed another vehicle 1100 (e.g., a school bus) are moving on the same lane 1110, the processor 870 may stop the vehicle 100 at a predetermined distance spaced from said another vehicle 1100, based on a driving regulation applied to said another vehicle.

In this case, if preset additional information (e.g., activation of a stop sign) is sensed from said another vehicle 1100, the processor 870 may stop the vehicle 100 at a predetermined distance spaced from said another vehicle 1100.

If preset additional information is sensed from said another vehicle 1100 while the vehicle 100 and said another vehicle 1100 are moving on the same lane 1110, the processor 870 may stop the vehicle 100 at a predetermined distance spaced from said another vehicle 1100.

Then, if the sensed preset additional information disappears (i.e., if an activated state of a stop sign is converted into an inactivated state, or if a state of the stop sign perpendicular to a side surface of said another vehicle is converted into a state of the stop sign parallel to the side surface), the processor 870 may autonomously drive the stopped vehicle 100 at a predetermined speed or less. Here, the autonomous driving of the stopped vehicle 100 at a predetermined speed or less may be a control which applies a driving regulation applied to said another vehicle.

Hereinafter, various methods to autonomously drive the vehicle in correspondence to a driving regulation applied to another vehicle will be explained in more detail with reference to the attached drawings.

In the following descriptions, it may be assumed that the vehicle is autonomously driven in correspondence to a driving regulation applied to another vehicle.

Further, in the following descriptions, it may be assumed that preset additional information is sensed from another vehicle such that the vehicle is autonomously driven in correspondence to a driving regulation applied to said another vehicle, or it may be assumed that a preset condition for autonomously driving the vehicle in correspondence to a driving regulation is satisfied from said another vehicle.

In a case where the vehicle 100 moves on a lane in the same direction as another vehicle to which a driving regulation is applied, and in a case where the vehicle 100 moves on a lane in an opposite direction to another vehicle to which a driving regulation is applied, the processor 870 of the vehicle control device 800 according to the present disclosure may perform different controls.

For instance, as shown in FIGS. 13A-C, if the vehicle 100 moves on a lane 1110 in the same direction as a sensed another vehicle 1100, the processor 870 may stop the vehicle 100 at a predetermined distance spaced from said another vehicle 1100.

As another example, in a case where the vehicle 100 moves on a lane in an opposite direction to the sensed another vehicle 1100, as shown in FIGS. 13A-C, the processor 870 may autonomously drive the vehicle 100 based on the number of lanes of a road on which the vehicle 100 is located, and a current position of the vehicle 100.

More specifically, as shown in FIG. 13A, if the number of lanes of a road on which the vehicle 100 is located is a predetermined number or less (e.g., if a total number of lanes of incoming and outgoing traffic including a lane in the same direction and a lane in an opposite direction is two or less), even if the vehicle 100 is moving on a lane in an opposite direction to the sensed another vehicle 1100, the processor 870 may stop the vehicle 100 at a predetermined distance spaced from said another vehicle 1100. The predetermined distance may be determined according to a driving regulation.

As shown in FIGS. 13B and C, if the number of lanes of a road on which the vehicle 100 is located exceeds the predetermined number (e.g., if a total number of lanes of incoming and outgoing traffic exceeds two (three or more), the processor 870 may stop the vehicle or may drive the vehicle at a predetermined speed or less, based on an area including a current position of the vehicle 100, and based on whether a median strip 1130 exists or not.

For instance, in a case where the number of lanes of a road exceeds the predetermined number, if there is no median strip as shown in FIG. 13B, a first driving regulation applied to a first area may regulate that the vehicle 100 on a lane 1120 in an opposite direction should stop at a predetermined distance spaced from said another vehicle 1100. In this case, if there is a median strip as shown in FIG. 13C, the first driving regulation may regulate that the vehicle 100 on the lane 1120 in an opposite direction should move at a predetermined speed or less (slow down, overtake).

If said another vehicle 1100 is sensed by the sensing unit 820, the vehicle 100 is located on a lane in a different direction from the sensed another vehicle 1100, the number of lanes of a road on which the vehicle 100 is located exceeds the predetermined number, and the vehicle 100 is located at the first area, the processor 870 may autonomously drive the vehicle 100 in correspondence to the first driving regulation applied to the first area.

In some implementations, even if the number of lanes of a road exceeds the predetermined number and there is no median strip, a second driving regulation applied to a second area different from the first area may regulate that the vehicle 100 on a lane in an opposite direction should pass over said another vehicle 1100 at a predetermined speed or less (slow down).

In some implementations, even if the number of lanes of a road exceeds the predetermined number and there is a median strip, the second driving regulation may regulate that the vehicle 100 on a lane in an opposite direction should stop at a predetermined distance spaced from said another vehicle 1100.

If said another vehicle 1100 is sensed by the sensing unit 820, the vehicle 100 is located on a lane in a different direction from the sensed another vehicle 1100, the number of lanes of a road on which the vehicle 100 is located exceeds the predetermined number, and the vehicle 100 is located at the second area, the processor 870 may autonomously drive the vehicle 100 in correspondence to the second driving regulation applied to the second area.

In some implementations, in a case where said another vehicle 1100 (e.g., a school bus) is sensed, even if preset additional information (e.g., a stopped state of said another vehicle 1100 or an activated state of a stop sign) is not sensed, the processor 870 may change a driving pattern of the vehicle when a specific object exists within a predetermined distance from said another vehicle 1100.

For instance, within a predetermined distance from the sensed another vehicle 1100, may exist a specific object (e.g., a school, a bus stop, a user who possesses a pre-registered mobile terminal so as to get in said another vehicle, or an owner who possesses a mobile terminal pre-authenticated with the mobile terminal of the user who is in said another vehicle (e.g., parent)). In this case, if the specific object is sensed within a predetermined distance from said another vehicle 1100, the processor 870 may change a driving pattern of the vehicle 100, even if said another vehicle 1100 is moving (i.e., even if said another vehicle is not in a stationary state or even if preset additional information is not sensed).

For instance, the processor 870 may autonomously drive the vehicle 100 at a predetermined speed or less, or decelerate the vehicle 100 (operate a brake), or immediately stop the vehicle 100.

So far, it was explained that said another vehicle 1100 to which a driving regulation is applied is a first type of another vehicle (e.g., a school bus).

When preset additional information sensed from said another vehicle to which a driving regulation is applied is a specific sound (for example, siren) (i.e., another vehicle sensed by the sensing unit 820 is a second type of another vehicle to which a driving regulation is applied (for example, a vehicle which sounds a siren, an ambulance, a police car, an ambulance, a fire truck, etc.)), the processor 870 may autonomously drive the vehicle such that the vehicle may not enter a predetermined area (or a predetermined distance) from said another vehicle.

A size of the predetermined area (or a length of the predetermined distance) may vary based on at least one of a driving regulation applied to said another vehicle, a type of said another vehicle, and the number of lanes of a road on which the vehicle is moving.

Figure 14A:
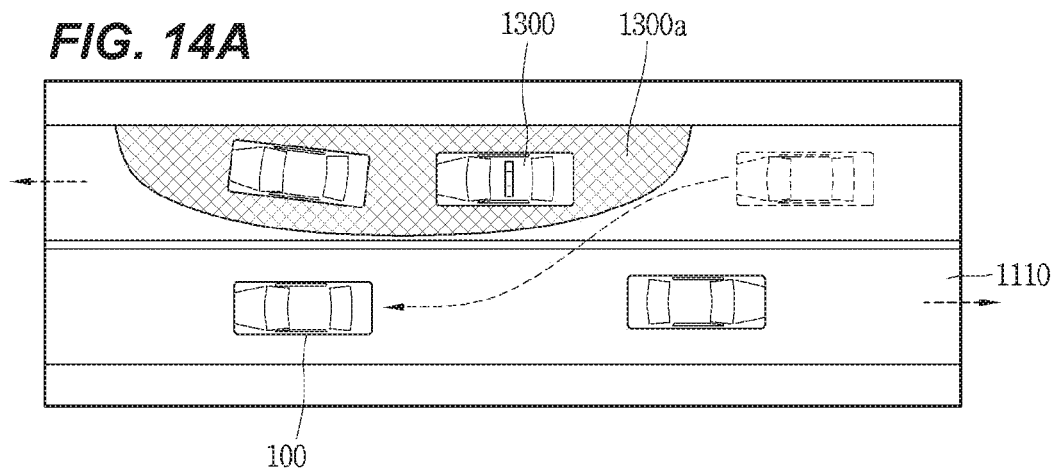

As shown in FIG. 14A, if a second type of another vehicle 1300 to which a driving regulation is applied is sensed by the sensing unit 820, and preset additional information (e.g., a specific sound (siren)) is sensed, the processor 870 may autonomously drive the vehicle 100 such that the vehicle 100 may not enter a predetermined area 1300a from said another vehicle 1300

As shown in FIG. 14A, if the number of lanes of a road on which the vehicle 100 is moving is equal to or less than a predetermined number (for example, two lanes of incoming and outgoing traffic, the processor 870 may control the vehicle 100 to move by passing over a center line for a predetermined section such that the vehicle 100 may not enter the predetermined area 1300a.

Figure 14B:
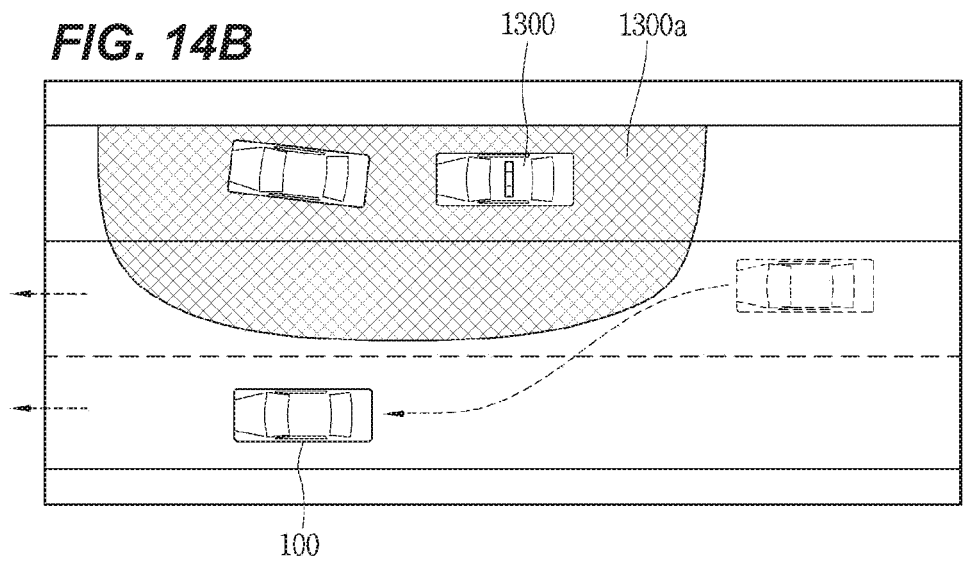
Figure 14C:
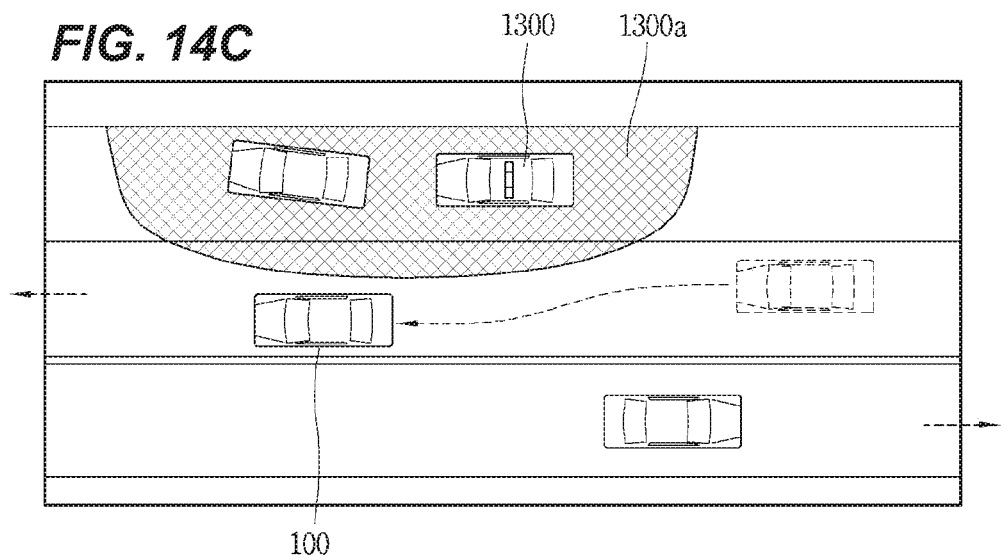

If the number of lanes of a road on which the vehicle 100 is moving is equal to or less than the predetermined number, the processor 870 may control the vehicle to be autonomously driven by changing a lane as shown in FIG. 14B, or control a driving path of the vehicle on the same lane, such that the vehicle 100 may not enter the predetermined area 1300a.

Figure 15:
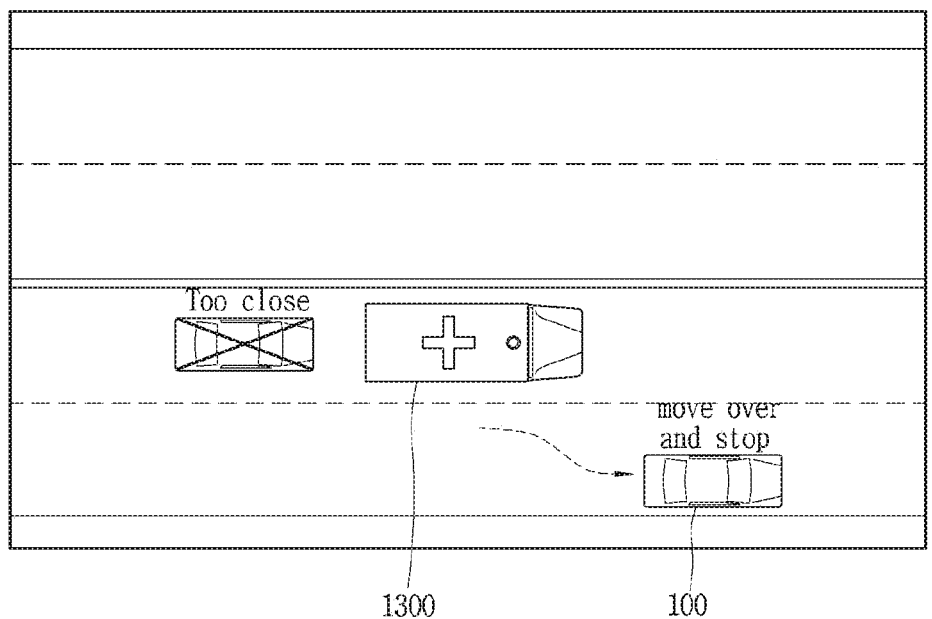

If the second type of another vehicle 1300 to which a driving regulation is applied is sensed from a rear side of a lane in the same direction as the vehicle 100 and preset additional information is sensed, as shown in FIG. 15, the processor 870 may autonomously drive the vehicle 100 such that said another vehicle may pass over the vehicle 100. In this case, the processor 870 may control the vehicle to move to a shoulder of a road and then to stop, or may control the vehicle to move out of a driving path of said another vehicle, such that said another vehicle may pass over the vehicle 100.

As shown in FIG. 15, the processor 870 may control the vehicle 100 not to approach a predetermined distance from a rear side of said another vehicle 1300, after said another vehicle passes over the vehicle 100.

If said another vehicle to which a driving regulation is applied (for example, the second type of another vehicle that sounds a siren) and the vehicle 100 are moving on lanes in opposite directions, the processor 870 may control the vehicle 100 in a different manner according to whether a median strip exists or not.

Figure 16A:
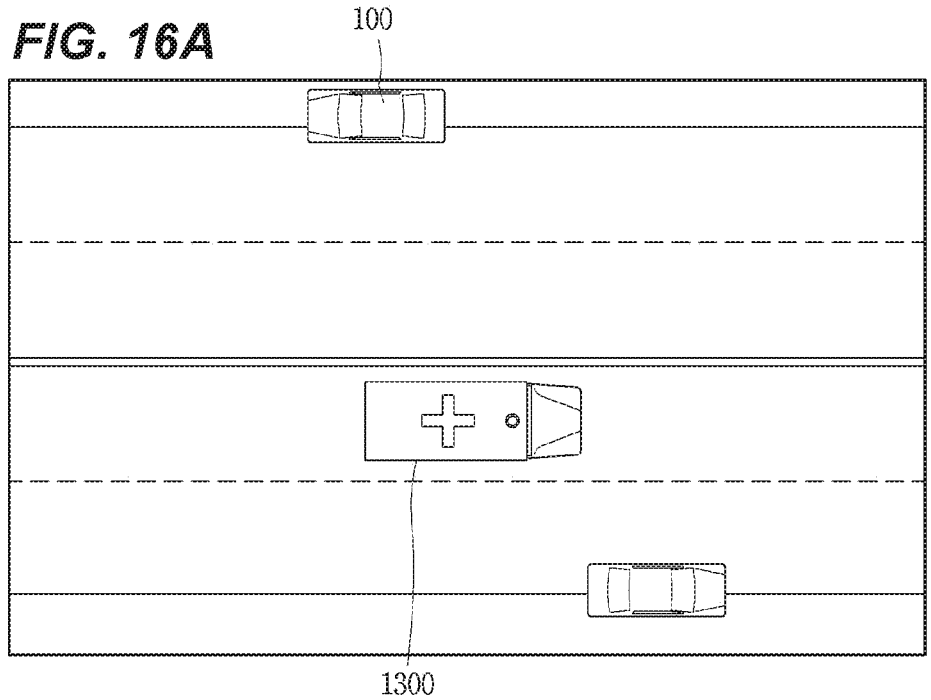

For instance, as shown in FIG. 16A, if there is no median strip, the processor 870 may autonomously drive the vehicle 100 such that the vehicle 100 may move in an opposite direction to the sensed another vehicle 1300 and then stop. Then, after the sensed another vehicle 1300 passes over the vehicle 100, the processor 870 may autonomously drive the vehicle 100 according to a predetermined algorithm.

Figure 16B:
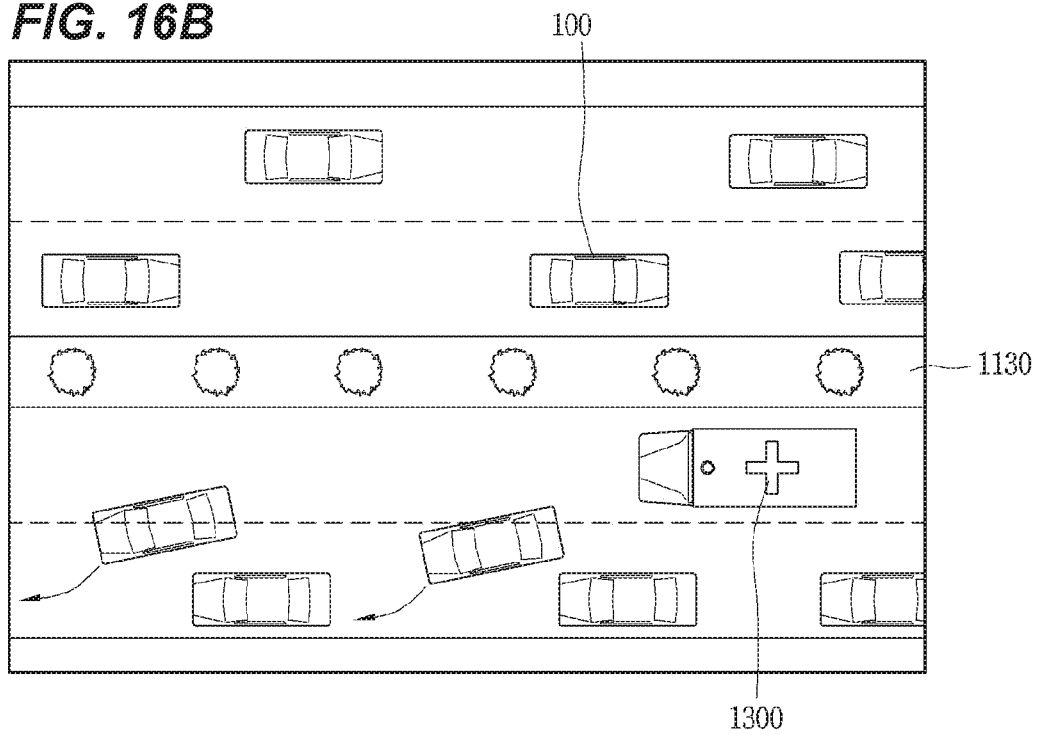

As another example, as shown in FIG. 16B, if there is a median strip 1130, the processor 870 may control the vehicle 100 to move at a predetermined speed or less (slow down), or may autonomously drive the vehicle 100 according to a predetermined algorithm.

If a third type of another vehicle 1400 (for example, a vehicle driven by an older driver of a predetermined age or more) to which a driving regulation is applied is sensed, the processor 870 may autonomously drive the vehicle 100 in correspondence to a predetermined driving regulation applied to the third type of another vehicle 1400.

Here, the processor 870 may determine (decide, detect, extract, identify or confirm) the third type another vehicle 1400, by receiving information indicating the third type of another vehicle from said another vehicle 1400 through V2V communication or V2X communication of the communication unit 810, or by sensing a mark attached to said another vehicle 1400 (e.g., a mark indicating the third type of another vehicle or a vehicle driven by a driver of a predetermined age or more) through the sensing unit 820 (e.g., a camera).

In this case, the processor 870 may autonomously drive the vehicle 100 in a different manner according to whether the third type of another vehicle 1400 and the vehicle 100 are moving on the same lane or on different lanes (or lanes adjacent to each other).

Figure 17:
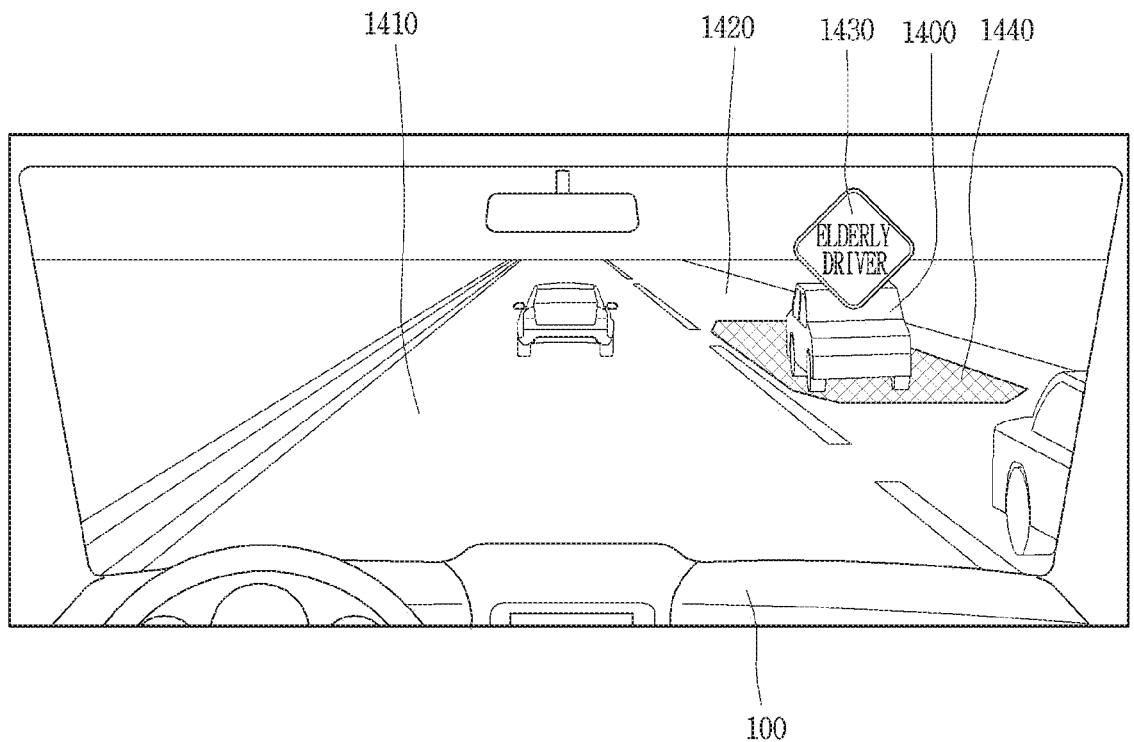

For example, as shown in FIG. 17, if the third type of another vehicle 1400 and the vehicle 100 are moving on different lanes (or lanes adjacent to each other) 1410, 1420, the processor 870 may control the vehicle 100 to pass over the third type of another vehicle 1400 in a state that a relative speed between the vehicle 100 and the third type of another vehicle 1400 is a predetermined speed or less.

Figure 18:
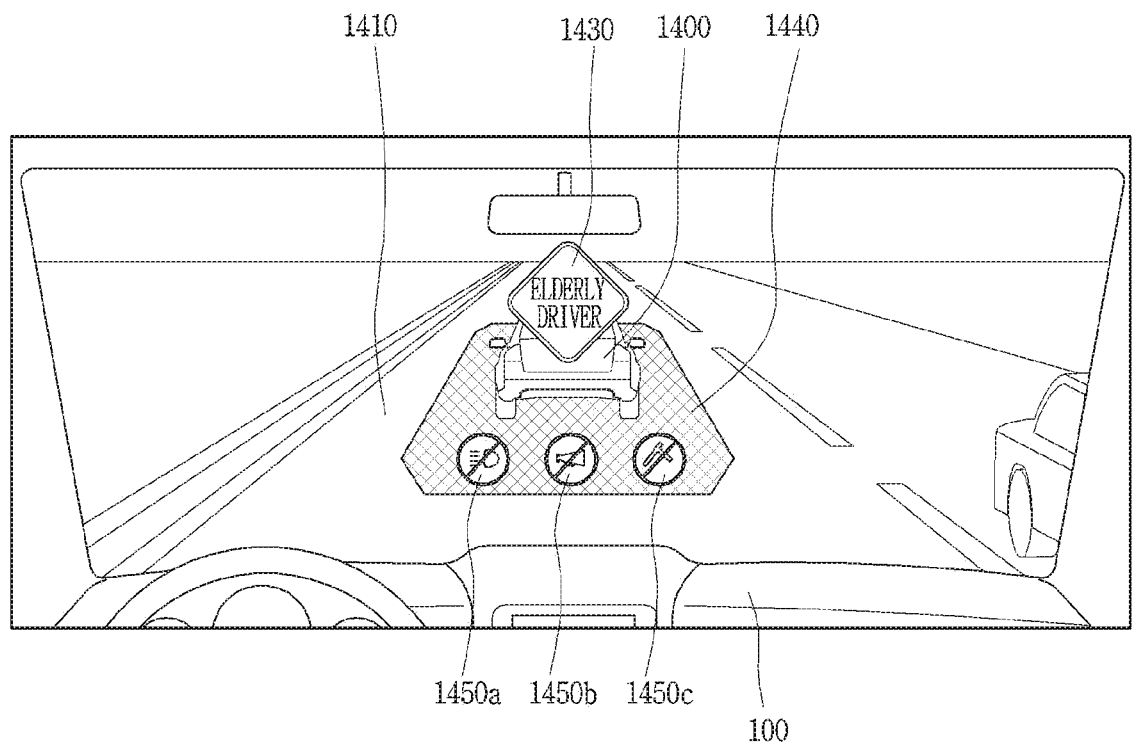

As another example, as shown in FIG. 18, if the vehicle 100 and the third type of another vehicle 1400 are moving on the same lane 1410, the processor 870 may restrict the vehicle 100 from outputting a high beam, outputting a klaxon and performing a drastic manipulation (e.g., sudden brake, sudden acceleration or sudden steering control).

With such a configuration, the present disclosure may provide a control method capable of autonomously driving the vehicle in an optimized manner according to a type of another vehicle to which a driving regulation is applied. The vehicle control apparatus 800 of the present disclosure may further include a display unit 830.

The processor 870 may control the display unit 830 to output information related to the aforementioned preset regulation when the vehicle 100 is in a manual driving mode.

For example, as shown in FIG. 11, the processor 870 may output, to the display unit 830 (e.g., HUD), information related to a preset driving regulation, the information determined based on a type of another vehicle sensed and an area including a current position of the vehicle 100.

For instance, as shown in FIG. 11, if the first another vehicle 1100 is sensed from a first area to which a first driving regulation is applied, the processor 870 may output information related to the first driving regulation (e.g., image, graphic object, text, figure, image, moving image, etc.) to the display unit 830.

As another example, as shown in FIG. 11B, if the first another vehicle 1100 is sensed from a second area to which a second driving regulation different from the first driving regulation is applied, the processor 870 may output information related to the second driving regulation to the display unit 830.

As shown in FIGS. 17 and 18, if another vehicle 1400 to which a driving regulation is applied is sensed, the processor 870 may output information (graphic objects) 1430, 1440, 1450a, 1450b, 1450c related to a preset driving regulation, to the display unit 830, based on a relative position between said another vehicle 1400 and the vehicle 100.

For example, when the vehicle 100 and said another vehicle 1400 are located on different lanes, the processor 870 may output only a first graphic object 1430 (information indicating a third type of another vehicle) and a second graphic object 1440 (area information for restricting entry), based on a preset driving regulation.

As another example, when the vehicle 100 and said another vehicle 1400 are located on the same lane, the processor 870 may output not only the first and second graphic objects 1430, 1440, but also third graphic objects 1450a, 1450b, 1450c (information indicating a restricted (prohibited) manipulation when the vehicle 100 and said another vehicle 1400 move on the same lane), to the display unit 830, based on a preset driving regulation.

In the above description, autonomously driving (controlling) the vehicle in correspondence to a preset driving regulation may be applied to outputting information related to the preset driving regulation to the display unit 830, in the same or similar manner.

The vehicle control device 800 described above may be included in the vehicle 100.

The operation or control method of the vehicle control device 800 described above may be applied to an operation or a control method of the vehicle 100 (or the controller 170) in the same manner or a similar manner.

For example, the control method of the vehicle 100 (or the control method of the vehicle control device 800) may include sensing another vehicle to which a vehicle restriction is applied, determining a current position of the vehicle, and autonomously driving the vehicle in correspondence to a preset driving regulation based on a current position of said another vehicle and the vehicle.

Each of the above steps may be performed not only by the vehicle control device 800, but also by the controller 170 of the vehicle 100.

Further, all functions, configurations, or control methods of the vehicle control device 800 described above may be performed by the controller 170 of the vehicle 100. That is, all the control methods described in this specification may be applied to a control method of the vehicle or a control method of the vehicle control device.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A vehicle control device comprising:
    a communicator configured to obtain a current position of a vehicle;
    a sensor configured to sense another vehicle subject to a driving regulation and obtain current position of the other vehicle;
    a processor;
    a display; and
    a computer-readable medium coupled to the processor having stored thereon instructions which, when executed by the processor, causes the processor to perform operations comprising:
        determining whether the vehicle and the other vehicle are moving on the same lane or on different lanes;
        autonomously driving the vehicle based on the respective current positions of the vehicle and the other vehicle in compliance with the driving regulation, the driving comprising:
            based on a determination that the vehicle and the other vehicle are moving on the same lane, restricting the vehicle from performing a preset manipulation; and
            based at least on a determination that the vehicle and the other vehicle are moving on different lanes, passing the other vehicle at a relative speed at or below a predetermined speed; and
        instructing the display to output information associated with the driving regulation, the instructing comprising:
            based on the determination that the vehicle and the other vehicle are moving on different lanes and based on the driving regulation, instructing the display to output a first graphic object; and
            based on the determination that the vehicle and the other vehicle are moving on the same lane and based on the driving regulation, instructing the display to output both the first graphic object and a second graphic object, the second graphic object indicating the restriction of the preset manipulation.

2. The vehicle control device of claim 1, wherein the sensing unit sensor is configured to sense a type of the other vehicle, and wherein the operations comprise:
    determining the driving regulation to be applied based on at least one of the current position of the vehicle or the type of the other vehicle; and
    applying the determined driving regulation to the autonomous driving.

3. The vehicle control device of claim 2, wherein the operations comprise determining the type of the other vehicle to match one of a plurality of predetermined types of vehicles, and
    wherein the determining of the driving regulation comprises determining a different driving regulation to be applied to the autonomous driving based on a respective driving regulation associated with the type of the other vehicle.

4. The vehicle control device of claim 3, wherein the respective driving regulation associated with the type of the other vehicle comprises a first driving regulation or a second driving regulation, wherein the first driving regulation is associated with the vehicle being located at a first area and the second driving regulation is associated with the vehicle being located at a second area, wherein the first and second driving regulations are different, and wherein the operations comprise:
    determining whether the vehicle is located at the first area or the second area,
    based on a determination that the vehicle is located at the first area, applying the first driving regulation; and
    based on a determination that the vehicle is located at the second area, applying the second driving regulation.

5. The vehicle control device of claim 2, wherein the determining of the driving regulation to be applied to the autonomous driving is based on the type of the other vehicle.

6. The vehicle control device of claim 5, wherein the type of the other vehicle comprises a first type or a second type, wherein the first type is different from the second type, wherein the driving regulation comprises a first driving regulation associated with the first type or a second driving regulation associated with the second type, wherein the first and second driving regulations are different, and wherein the operations comprise:
    determining whether the type of the other vehicle is the first type or the second type;
    based on a determination that the type of the other vehicle is the first type, applying the first driving regulation to the autonomous driving; and
    based on a determination that the type of the other vehicle is the second type, applying the second driving regulation to the autonomous driving.

7. The vehicle control device of claim 1, wherein the sensor is configured to sense additional information associated with the other vehicle, and wherein the operations comprise:
    determining that the additional information associated with the other vehicle is sensed;
    determining the driving regulation based on the sensed additional information; and
    applying the determined driving regulation to the autonomous driving.

8. The vehicle control device of claim 7, wherein the applying the determined driving regulation to the autonomous driving comprises:
    determining to stop the vehicle based on the vehicle having a same direction of travel as the other vehicle; and
    stopping the vehicle at a predetermined distance from the other vehicle based on the determination to stop the vehicle.

9. The vehicle control device of claim 8, wherein the applying the determined driving regulation to the autonomous driving comprises:
    determining that the additional information associated with the other vehicle is no longer sensed; and
    resuming movement of the vehicle at a speed less than or equal to a second predetermined speed.

10. The vehicle control device of claim 7, wherein the operations comprise:
    determining that the vehicle is moving in a different direction with respect to the other vehicle; and
    autonomously driving the vehicle based on a number of lanes of a road on which the vehicle is located and the current position of the vehicle.

11. The vehicle control device of claim 10, wherein the operations comprise:
    determining whether the number of lanes of the road on which the vehicle is located is less than or equal to a predetermined number,
    based on a determination that the number of lanes of the road on which the vehicle is located is less than or equal to the predetermined number, stopping the vehicle at a predetermined distance from the other vehicle; and based on a determination that the number of lanes of the road on which the vehicle is located is greater than the predetermined number, stopping the vehicle or moving the vehicle at a speed less than or equal to a second predetermined speed based on the current position of the vehicle and a presence of a median strip.

12. The vehicle control device of claim 7, wherein the operations comprise:
   determining that the sensed additional information is one of a plurality of predetermined specific sounds; and
   autonomously driving the vehicle to avoid a predetermined area around the other vehicle.

13. The vehicle control device of claim 12, wherein the sensed additional information is one of the plurality of predetermined specific sounds, and wherein the operations comprise:
   determining that the vehicle is moving in a different direction with respect to the other vehicle;
   determining a presence of a median strip; and
   autonomously driving the vehicle based on the determination of the presence of the median strip.

14. The vehicle control device of claim 1, wherein the vehicle is in a manual driving mode, and wherein the operations comprise instructing the display to output information associated with the driving regulation.

15. The vehicle control device of claim 1, wherein the vehicle is currently located in a first state or a first country, the operations comprise:
   determining, based on the current position of the vehicle, that the vehicle is entering a second state or a second country different from the first state or the first country; and
   based on the determination that the vehicle is entering a second state or a second country, obtaining, through the communicator, an updated driving regulation corresponding to the second state or the second country.

16. The vehicle control device of claim 1, wherein the vehicle is moving along a planned route comprising two or more segments corresponding to different states or different countries, and wherein the operations comprise:
   obtaining, based on the planned route, driving regulations corresponding to the different states or countries; and
   applying corresponding driving regulations to corresponding segments of the planned route.

17. The vehicle control device of claim 1, wherein the preset manipulation comprises one or more of: outputting a high beam; outputting a klaxon; or abrupt vehicle control.

18. The vehicle control device of claim 17, wherein the abrupt vehicle control comprises one or more of: abrupt braking; abrupt acceleration; or abrupt steering control.

19. A vehicle comprising:
   a plurality of wheels;
   a power source configured to drive the plurality of wheels; and
   the vehicle control device of claim 1.

20. A method of controlling a vehicle, the method comprising:
   sensing, through a sensor, another vehicle subject to a driving regulation; obtaining, through the sensor, a current position of the other vehicle;
   obtaining, through a communicator, a current position of the vehicle;
   determining, whether the vehicle and e other vehicle are moving on the same lane or on different lanes,
   autonomously driving the vehicle based on the respective current positions of the vehicle and the other vehicle in compliance with the driving regulation, the driving comprising:
      based on a determination that the vehicle and the other vehicle are moving on the same lane, restricting the vehicle from performing a preset manipulation; and
      based at least on a determination that the vehicle and the other vehicle are moving on different lanes, passing the other vehicle at a relative speed at or below a predetermined speed; and
   outputting, through a display, information associated with the driving regulation, the outputting comprising:
      based on the determination that the vehicle and the other vehicle are moving on different lanes and based on the driving regulation, outputting a first graphic object; and
      based on the determination that the vehicle and the other vehicle are moving on the same lane and based on the driving regulation, outputting both the first graphic object and a second graphic object, the second graphic object indicating restriction of the preset manipulation.

* * * * *